US007065480B2

(12) United States Patent
Fujimori et al.

(10) Patent No.: US 7,065,480 B2
(45) Date of Patent: Jun. 20, 2006

(54) NOISE COUNTERMEASURE DETERMINATION METHOD AND APPARATUS AND STORAGE MEDIUM

(75) Inventors: Shogo Fujimori, Kawasaki (JP);
Yasuhiro Yamashita, Kawasaki (JP);
Ryoji Yamada, Kawasaki (JP); Masaki Tosaka, Kawasaki (JP); Kazuhiko Tokuda, Kawasaki (JP); Jiro Yoneda, Kawasaki (JP); Makoto Suwada, Kawasaki (JP); Tatsuo Koizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 813 days.

(21) Appl. No.: 09/750,051

(22) Filed: Dec. 29, 2000

(65) Prior Publication Data
US 2001/0041970 A1 Nov. 15, 2001

(30) Foreign Application Priority Data
May 11, 2000 (JP) ............................. 2000-138681
May 29, 2000 (JP) ............................. 2000-159100

(51) Int. Cl.
*G06F 17/50* (2006.01)
(52) U.S. Cl. ................................. 703/14; 703/1; 716/1
(58) Field of Classification Search ................ 703/14, 703/1; 382/173; 716/1
See application file for complete search history.

(56) References Cited

U.S. PATENT DOCUMENTS 5,555,506 A * 9/1996 Petschauer et al. ........... 703/13
5,559,997 A   9/1996 Tsuchida et al.
5,682,336 A * 10/1997 Chian et al. ................... 703/3
6,278,951 B1 * 8/2001 Sato ............................ 702/57
6,493,658 B1 * 12/2002 Koford et al. ................ 703/1
6,597,808 B1 * 7/2003 Guo et al. ................... 382/173

FOREIGN PATENT DOCUMENTS

| JP | 7-152824   | 6/1995  |
| JP | 8-297689   | 11/1996 |
| JP | 9-245076   | 9/1997  |
| JP | 10-097551  | 4/1998  |

OTHER PUBLICATIONS

The Electrical Engineering Handbook, Second Edition, Richard C. Dorf, CRC Press, 1997, pp. 2265-2272.*

* cited by examiner

*Primary Examiner*—Paul L. Rodriguez
*Assistant Examiner*—Dwin M. Craig
(74) *Attorney, Agent, or Firm*—Staas & Halsey, LLP

(57) ABSTRACT

A noise countermeasure determination method includes the steps of calculating recommended circuit information considered to minimize a noise by use of at least one formula, based on input circuit information amounting to at least one net of a target circuit which is to be subjected to a noise analysis, and comparing the input circuit information and the recommended circuit information, and determining a differing portion of the recommended circuit information differing from the input circuit information, as noise countermeasures.

22 Claims, 20 Drawing Sheets

WIRING TOPOLOGY: LOAD CONCENTRATION TYPE
CHARACTERISTIC IMPEDANCE OF WIRING PATTERN: $Z_0=60\,\Omega$
TRANSMISSION DELAY TIME OF WIRING PATTERN : $T_d=7.0$ns/m WIRING TOPOLOGY: LOAD CONCENTRATION TYPE
CHARACTERISTIC IMPEDANCE OF WIRING PATTERN: $Z_0=60\,\Omega$
TRANSMISSION DELAY TIME OF WIRING PATTERN : $T_d=7.0$ns/m WIRING TOPOLOGY: STAR TYPE
CHARACTERISTIC IMPEDANCE OF WIRING PATTERN: $Z_0=60\,\Omega$
TRANSMISSION DELAY TIME OF WIRING PATTERN : $T_d=7.0\,ns/m$ WIRING TOPOLOGY: LOAD CONCENTRATION TYPE
CHARACTERISTIC IMPEDANCE OF WIRING PATTERN: $Z_0=60\,\Omega$
TRANSMISSION DELAY TIME OF WIRING PATTERN : $T_d=7.0\,ns/m$ WIRING TOPOLOGY: STAR TYPE
CHARACTERISTIC IMPEDANCE OF WIRING PATTERN: $Z_0=60\Omega$
TRANSMISSION DELAY TIME OF WIRING PATTERN : $T_d=7.0$ns/m WIRING TOPOLOGY: LOAD CONCENTRATION TYPE
CHARACTERISTIC IMPEDANCE OF WIRING PATTERN: $Z_0=60\Omega$
TRANSMISSION DELAY TIME OF WIRING PATTERN : $T_d=7.0$ns/m FIG. 24
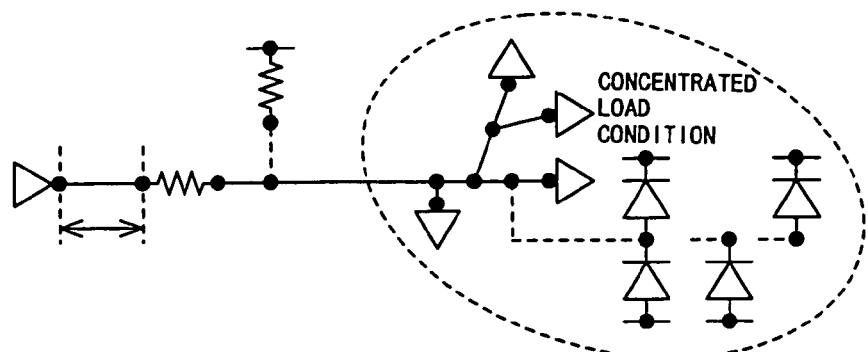
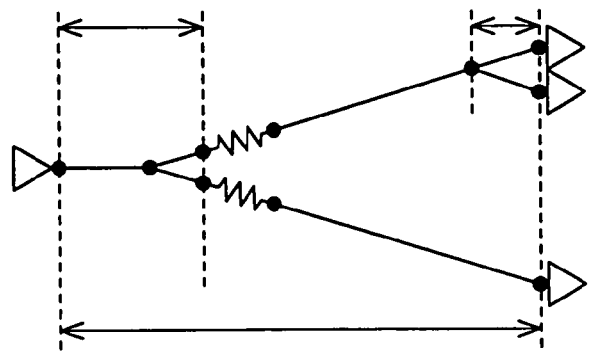
FIG. 25A
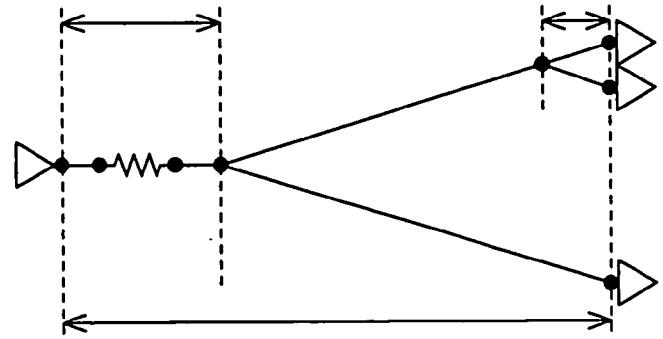
FIG. 25B

NOISE COUNTERMEASURE DETERMINATION METHOD AND APPARATUS AND STORAGE MEDIUM

BACKGROUND OF THE INVENTION

This application claims the benefit of a Japanese Patent Applications No. 2000-138681 filed May 11, 2000 and No. 2000-159100filed May 29, 2000, in the Japanese Patent Office, the disclosures of which are hereby incorporated by reference.

1. Field of the Invention

The present invention generally relates to noise countermeasure determination methods and apparatuses and storage media, and more particularly to a noise countermeasure determination method which determines noise countermeasures for guaranteeing a normal operation of an electronic circuit by minimizing noise which may be generated in the electronic circuit when designing the electronic circuit such as a large scale integrated (LSI) circuit, multi-chip module (MCM) and printed circuit board (PCB), and to a noise countermeasure determination apparatus which determines the noise countermeasures by such a noise countermeasure determination method, and to a computer-readable storage medium which stores a program for causing a computer to carry out such a noise countermeasure determination.

Recently, the noise countermeasures and noise analysis have become important when designing the electronic circuit, particularly because the size of electronic circuits has decreased considerably and the operation speed of the electronic circuits has increased greatly. The noise countermeasures refer to various measures which are taken to suppress the noise generated in the electronic circuit, based on results obtained by the noise analysis.

2. Description of the Related Art

Conventionally, various kinds of noise analyzing tools have been proposed to carry out the noise analysis when designing the electronic circuit. The noise analyzing tool carries out the noise analysis and a noise check using a circuit simulator after an assemble design of the electronic circuit is made, so as to determine noise countermeasures for suppressing the noise. The design of the electronic circuit is modified if necessary based on the determined noise countermeasures. After such a design modification, the noise analysis and the noise check are carried out again, and the above described procedure is repeated until the noise falls within a tolerable range.

The noise which is to be mainly considered when designing the electronic circuit includes reflection noise and crosstalk noise. Normally, the reflection noise is generated by a mismatch of an internal resistance of a driver and a characteristic impedance of a transmission line. In order to suppress the reflection noise, a method has been proposed to insert a damping resistor in series to an output of the driver particularly in the case of a 1:1 transmission. According to this proposed method, a resistance of the damping resistor is selected so that a sum of the internal resistance of the driver and the damping resistance becomes equal to the characteristic impedance of the transmission line.

The reflection noise in transmissions other than the 1:1 transmission, such as a 1:N transmission, greatly depends on the wiring (or routing) topology. For this reason, the wiring topology is selected manually, so as to carry out the wiring to suit the wiring topology selected by the designer. Accordingly, the circuit simulator carries out the noise analysis and the noise check based on the wiring information. If noise exceeding a tolerable range exists as a result of the noise analysis, operations such as a modification of the wiring topology, a rewiring to suit the wiring topology, a noise analysis and a noise check are repeated so as to find an optimum wiring topology.

On the other hand, the crosstalk noise greatly depends on the driving capacity of the driver, a gap between adjacent patterns, and the like. Usually, the crosstalk analysis requires information related to the adjacent patterns, and for this reason, the noise analysis and the noise check are carried out after the assemble design of the electronic circuit is made, using assemble design data. The information related to the adjacent patterns include a pattern gap, a distance for which the patterns run parallel to each other, a position where the patterns are parallel on the transmission lines, and the like.

However, due to the further size reduction and the further increased operation speed of recent electronic circuits, the number of nets which require the noise analysis and the noise check is increasing, thereby increasing the number of design steps. A net refers to a part which is made up of at least one target circuit element when designing the electronic circuit. For this reason, it is necessary to take noise countermeasures not requiring a backward process which is a repetition of manual operations including circuit design, assemble design and noise analysis. In other words, prior to the circuit design and the assemble design, it is necessary to create a circuit model amounting to at least one net, so as to determine the noise countermeasures based on the circuit model input.

But even in a case where the circuit model amounting to at least one net is created and the noise analysis and the noise countermeasures are carried out, before the circuit design and the assemble design, a processing time as a whole becomes considerably long if the noise countermeasures are always determined by the circuit simulator, since a processing time of the circuit simulator is long compared to other processes. Consequently, the problem of the considerably long processing time of the circuit simulator becomes particularly conspicuous when repeating operation cycles such as design, analysis, countermeasures (design modification) and analysis. For this reason, there were demands to determine the noise countermeasures by suppressing the operation of the circuit simulator to a minimum.

In order to suppress the operation of the circuit simulator to a minimum, it is necessary to select the damping resistance without using the results of the circuit simulator, even for the countermeasures against the reflection noise. However, if the damping resistance which matches the output resistance of the driver element and the characteristic impedance of the wiring is used as the recommended circuit information, this damping resistance will not match the damping resistance which is already inserted in the input circuit information, even though a problem will not occur in the actual transmission waveform. As a result, there was a problem in that the noise countermeasures which are determined in such a case may be too severe and require the damping resistor to be modified.

In addition, when determining the wiring topology, it is necessary to repeat the wiring topology selection, wiring modification and noise analysis. But if the wiring topology selection and the wiring modification are to be made by the designer, there was a problem in that it takes too long to carry out such operations manually. For this reason, there were demands to repeat the wiring topology selection, wiring modification and noise analysis within a short time, and to determine the noise countermeasures by selecting an optimum wiring topology.

Furthermore, according to the crosstalk noise analyzing method described above, the noise analysis and the noise check are made using the design data after the assemble design. Accordingly, when the crosstalk noise is found as a result of the noise check, it is necessary to modify the assemble design, and the design steps need to include a backward process which repeat manual operations. Consequently, there were demands to reduce the design steps by eliminating the backward process which repeat manual operations.

SUMMARY OF THE INVENTION

Accordingly, it is a general object of the present invention to provide a novel and useful noise countermeasure determination method and apparatus and computer-readable storage medium, in which the problems described above are eliminated.

A first object of the present invention is to provide a noise countermeasure determination method and apparatus and computer-readable storage medium which can determine noise countermeasures before a circuit design and an assemble design, and suppress an operation of a circuit simulator to a minimum when determining the noise countermeasures, so that the noise countermeasures can be determined at a high speed without generating in design steps a backward process which is a repetition of manual operations.

A second object of the present invention is to provide a noise countermeasure determination method and apparatus and computer-readable storage medium which can determine a damping resistance without the need to carry out an operation of a circuit simulator and without making the noise countermeasures too severe.

A third object of the present invention is to provide a noise countermeasure determination method and apparatus and computer-readable storage medium which can determine an optimum wiring topology from relative positional relationships on an actual printed circuit board or the like, prior to a circuit design and an assemble design.

A fourth object of the present invention is to provide a noise countermeasure determination method and apparatus and computer-readable storage medium which can determine noise countermeasures by taking crosstalk noise into consideration, by analyzing the crosstalk noise prior to a circuit design and an assemble design.

Another and more specific object of the present invention is to provide a noise countermeasure determination method and apparatus and computer-readable storage medium, which can suppress the operation of a circuit simulator to a minimum when determining noise countermeasures, so that the noise countermeasures can be determined at a high speed without generating in the design steps a portion which requires a backward process which is a repetition of manual operations.

Still another object of the present invention is to provide a noise countermeasure determination method comprising the steps of (a) calculating recommended circuit information considered to minimize a noise by use of at least one formula, based on input circuit information amounting to at least one net of a target circuit which is to be subjected to a noise analysis, and (b) comparing the input circuit information and the recommended circuit information, and determining a differing portion of the recommended circuit information differing from the input circuit information, as noise countermeasures. According to the noise countermeasure determination method of the present invention, it is possible to realize the first object described above.

The noise countermeasure determination method may further comprise the steps of (c) creating a simulation model of the input circuit information after determining the noise countermeasures in the step (b), (d) carrying out a circuit simulation using the simulation model, to calculate a signal waveform propagating through a wiring of the target circuit and to check whether or not a noise exceeding a tolerable range exists in the signal waveform, and (e) categorizing the noise existing as a result of the noise check carried out in the step (d), and optimizing the determined noise countermeasures to only portions related to the noise. According to the noise countermeasure determination method of the present invention, it is possible to realize the second object described above.

The noise countermeasure determination method may further comprises the step of (c) outputting input circuit information which includes as, a wiring length, a Manhattan distance which is determined based on positions of part pins forming the target circuit and a wiring topology. According to the noise countermeasure determination method, it is possible to realize the third object described above.

The noise countermeasure determination method may further comprise the steps of (c) creating a simulation model of input circuit information made up of circuit information of a target net which is to be subjected to the noise analysis and circuit information of an adjacent net which is adjacent to the target net, after determining the noise countermeasures in the step (b), (d) carrying out a circuit simulation using the simulation model, to obtain a noise combined waveform by combining a crosstalk noise waveform and a signal waveform propagating through the target net which are calculated, and to check whether or not a noise exceeding a tolerable range exists based on the noise combined waveform, and (e) categorizing the noise existing as a result of the noise check carried out in the step (d), and optimizing the determined noise countermeasures to only portions related to the noise. According to the noise countermeasure determination method of the present invention, it is possible to realize the fourth object described above.

A further object of the present invention is to provide a noise countermeasure determination apparatus comprising a recommended circuit information calculating section calculating recommended circuit information considered to minimize a noise by use of at least one formula, based on input circuit information amounting to at least one net of a target circuit which is to be subjected to a noise analysis, and a noise countermeasure determination section comparing the input circuit information and the recommended circuit information, and determining a differing portion of the recommended circuit information differing from the input circuit information, as noise countermeasures. According to the noise countermeasure determination apparatus of the preset invention, it is possible to realize the first object described above.

Another object of the present invention is to provide a computer-readable storage medium which stores a program for causing a computer to determine noise countermeasures, where the program comprises a recommended circuit information calculating procedure causing the computer to calculate recommended circuit information considered to minimize a noise by use of at least one formula, based on input circuit information amounting to at least one net of a target circuit which is to be subjected to a noise analysis, and a noise countermeasure determination procedure causing the computer to compare the input circuit information and the recommended circuit information, and to determine a differing portion of the recommended circuit information differing from the input circuit information, as noise countermeasures. According to the computer-readable storage medium of the present invention, it is possible to realize the first object described above.

Therefore, according to the present invention, it is possible to realize a noise countermeasure determination method and apparatus and computer-readable storage medium, which can suppress the operation of a circuit simulator to a minimum when determining noise countermeasures, so that the noise countermeasures can be determined at a high speed without generating in the design steps a portion which requires a backward process which is a repetition of manual operations.

Other objects and further features of the present invention will be apparent from the following detailed description when read in conjunction with the accompanying drawings.

BRIEF DESCRIPTION OF THE DRAWINGS

FIG. 24 is a diagram showing a load concentration type wiring topology for a unidirectional transmission;

FIGS. 25A and 25B respectively are diagrams showing a star type wiring topology for the unidirectional transmission.

DESCRIPTION OF THE PREFERRED EMBODIMENTS

Figure 1:
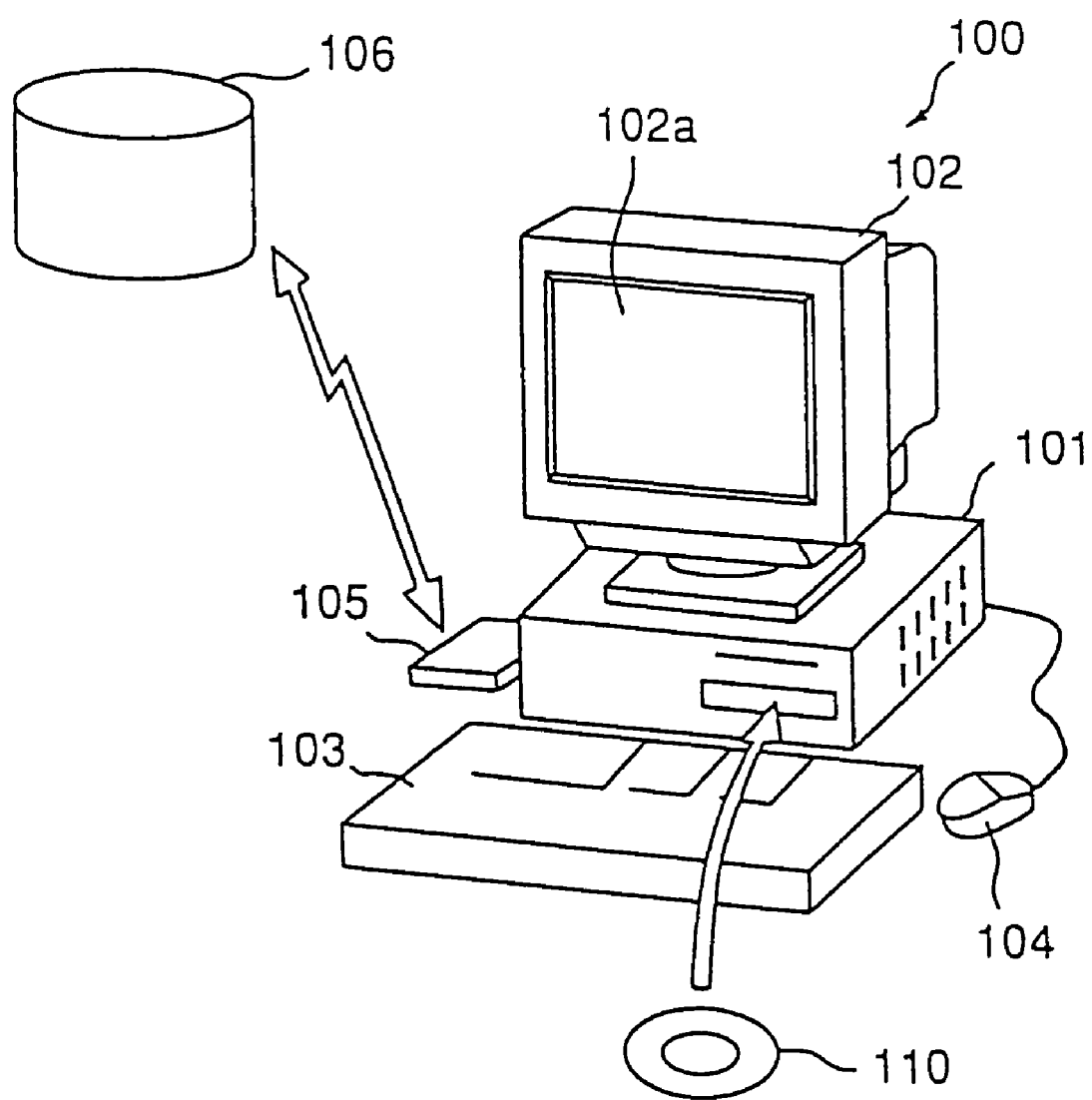
FIG. 1 is a perspective view showing a computer system applied with the present invention in a first embodiment of the present invention.

A description will be given of various embodiments of a noise countermeasure determination method, a noise countermeasure determination apparatus and a computer-readable storage medium according to the present invention, by referring to the drawings.

First, a description will be given of a first embodiment of the noise countermeasure determination apparatus according to the present invention. This first embodiment of the noise countermeasure determination apparatus employs a first embodiment of the noise countermeasure determination method according to the present invention and a first embodiment of the computer-readable storage medium according to the present invention. In this first embodiment, the present invention is applied to a computer system. FIG. 1 is a perspective view showing the computer system to which the present invention is applied in this first embodiment. It is assumed for the sake of convenience that the computer system shown in FIG. 1 is also used in each of second and subsequent embodiments which will be described later.

A computer system 100 shown in FIG. 1 is generally provided with a main body 101 which includes a CPU, a disk drive and the like, a display 102 which includes a display screen 102a for displaying an image in response to an instruction from the main body 101, a keyboard 103 which is used to input various information to the computer system 100, a mouse 104 which is used to specify an arbitrary position on the display screen 102a of the display 102, and a modem 105 which is used to access an external database or the like and to download programs or the like stored in another computer system.

A noise countermeasure determination program (or a noise countermeasure determination software) which causes the computer system 100 to have a noise countermeasure determination function is stored in a portable recording medium such as a disk 110 or, is downloaded from a recording medium 106 of another computer system using a communication unit such as the modem 105. The computer-readable storage medium according to the present invention is formed by a recording medium, such as the disk 110, which stores the noise countermeasure determination program. The recording medium forming the computer-readable storage medium according to the present invention is not limited to portable recording media such as the disk 110, IC card memory, floppy disk, magneto-optical disk and CD-ROM, but also includes various kinds of recording media which are accessible by a computer system which is coupled via the communication unit or communication means such as the modem 105 and LAN.

Figure 2:
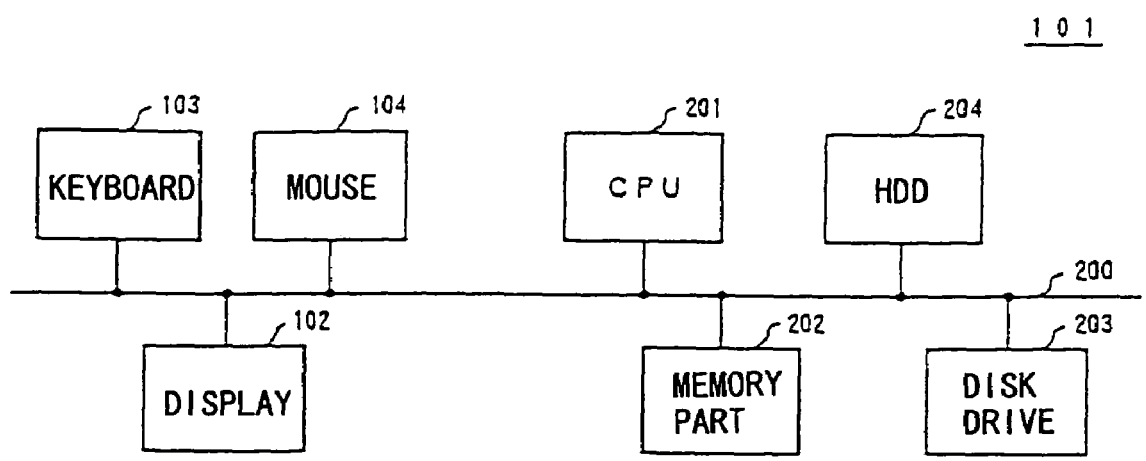
FIG. 2 is a system block diagram for explaining a construction of an important part within a main body of the computer system.

FIG. 2 is a system block diagram for explaining the structure of an important part within the main body 101 of the computer system 100. In FIG. 2; the main body 101 generally includes a CPU 201, a memory part 202 made of RAM, ROM or the like, a disk drive 203 for the disk 110, and a hard disk drive (HDD) 204 which are connected via a bus 200. The display 102, the keyboard 103, the mouse 104 and the like maybe connected to the CPU 201 via the bus 200 as shown in FIG. 2 or, connected directly to the CPU 201. It is also possible to connect the display 102 to the CPU 201 via a known graphic interface (not shown) which carries out an input/output image data processing.

Of course, the structure of the computer system 100 is not limited to that shown in FIGS. 1 and 2, and various other known structures may be used instead.

Figure 3:
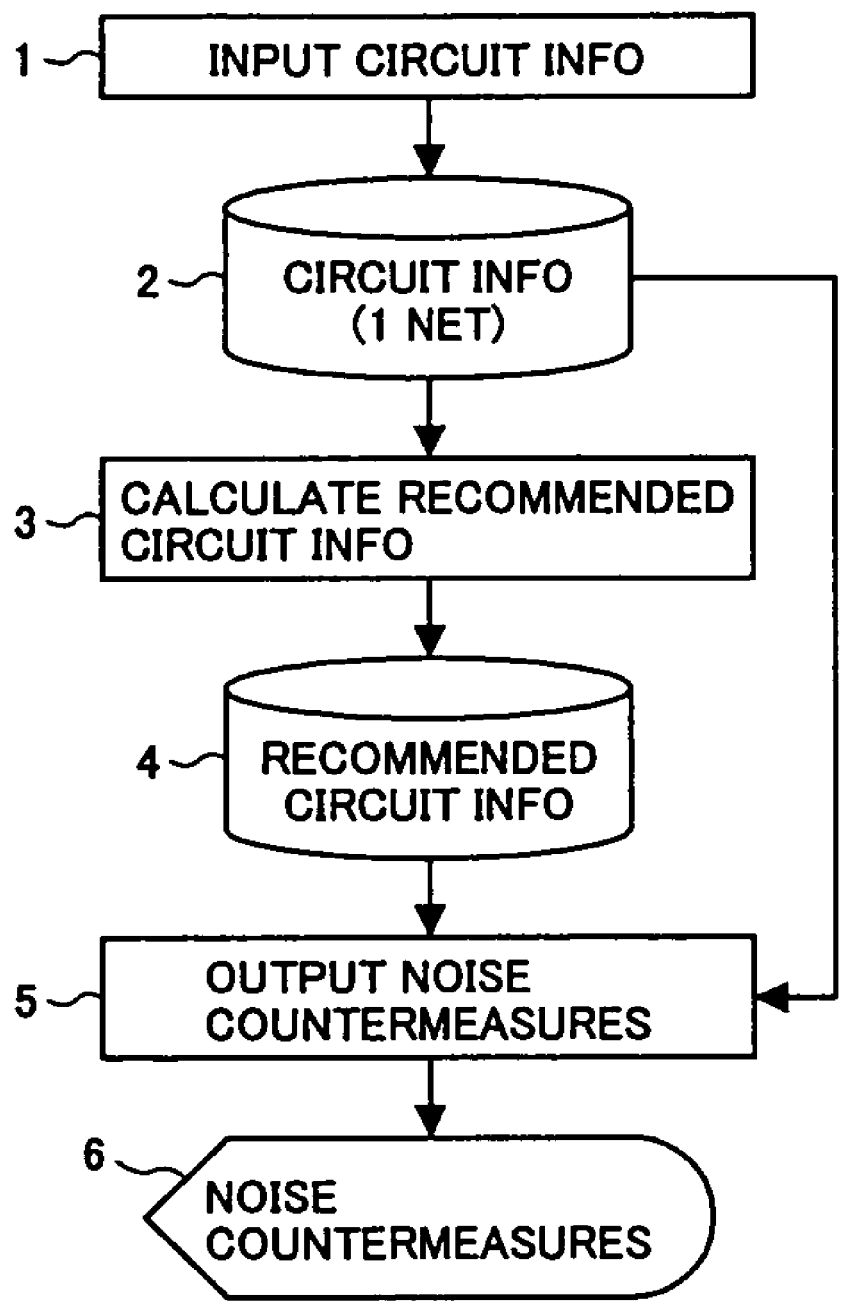
FIG. 3 is a flow chart for explaining a noise countermeasure determination process of a CPU in the first embodiment.

FIG. 3 is a flow chart for explaining a noise countermeasure determination process of the CPU 201 in this first embodiment. In this embodiment, noise countermeasures are determined without the use of a circuit simulator, before a circuit design and an assemble design of a target electronic circuit are made. In FIG. 3, when the noise countermeasure determination process is started, a step 1 inputs input circuit information amounting to at least one net of a target electronic circuit from the keyboard 103 or an external unit. A step 2 stores the input circuit information in a storage means such as the memory part 202. A step 3 calculates recommended circuit information which is considered to minimize noise using at least one calculation formula, based on the input circuit information read from the memory part 202. The recommended circuit information includes a damping resistance, a wiring length between a driver and a resistor, a wiring length between a resistor and a receiver, a position of a wiring branching point, a wiring length between a resistor and a branching point, a wiring length between a branching point and a receiver, a driving capacity of a driver, a number of loads (receivers), and the like. A step 4 stores the calculated recommended circuit information in a storage means such as the memory part 202. A step 5 compares the input circuit information and the recommended circuit information read from the memory part 202, and determines differing portions of the recommended circuit information as noise countermeasures. A step 6 outputs the determined noise countermeasures by displaying the noise countermeasures on the display 102, for example.

Figure 4:
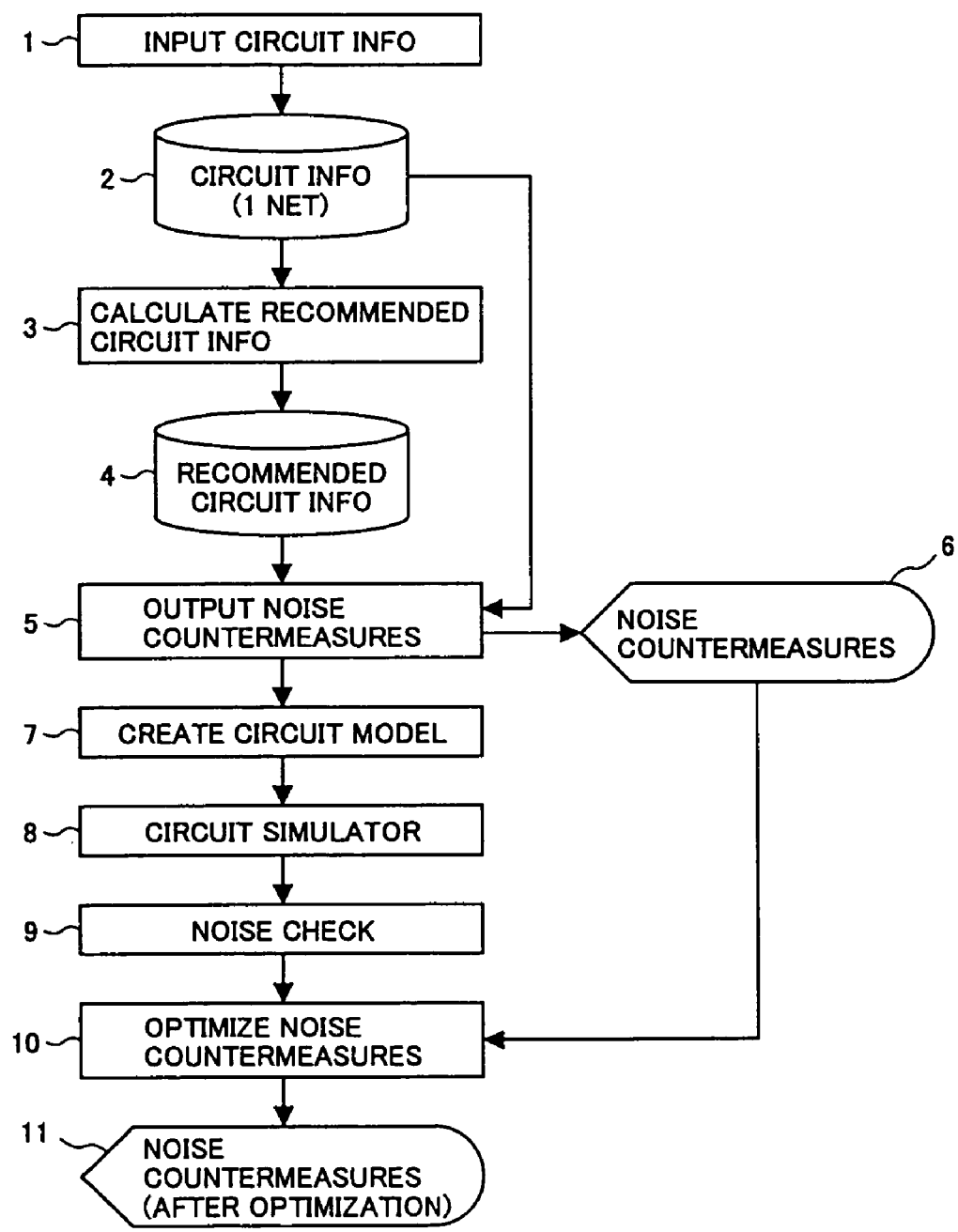
FIG. 4 is a flow chart for explaining a noise countermeasure determination process of the CPU in a second embodiment of the present invention.

FIG. 4 is a flow chart for explaining a noise countermeasure determination process of the CPU 201 of the computer system 100 which is applied with a second embodiment of the noise countermeasure determination method, a second embodiment of the noise countermeasure determination apparatus and a second embodiment of the computer-readable storage medium according to the present invention. In FIG. 4, those steps which are the same as those corresponding steps in FIG. 3 are designated by the same reference numerals, and a description thereof will be omitted. In this second embodiment, the noise countermeasures determined by the first embodiment described above are further optimized using analysis results of a circuit simulator, so as to determine more restricted noise countermeasures.

In FIG. 4, a step 7 creates a circuit mode, that is, a simulation model, based on the noise countermeasures obtained by the step 5. A step 8 analyzes the created circuit model using a circuit simulator. A step 9 checks whether or not a noise which cause problems, that is, a noise exceeding a tolerable range, is generated, based on the analysis results of the circuit simulator. The noise check is made by detecting the noise existing in a signal waveform propagating through a wiring of the electronic circuit, for example, which signal waveform is output from the circuit simulator. A step 10 categorizes results of the noise check, and restricts the noise countermeasures output by the step 6 to only portions related to the categorized results of the noise check. A step 11 outputs the restricted noise countermeasures by displaying the restricted noise countermeasures on the display 102, for example.

According to the first and second embodiments described above, it is possible to determine the noise countermeasures before the circuit design and the assemble design of the target electronic circuit, by inputting the circuit information amounting to at least one net. In addition, by obtaining the recommended circuit information based on the at least one calculation formula, it is possible to determine the noise countermeasures by suppressing the operation of the circuit simulator to a minimum as in the second embodiment.

Figure 5:
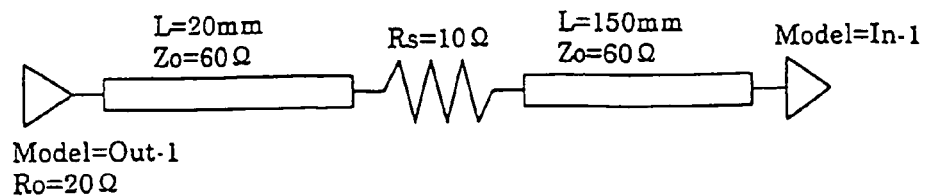
FIG. 5 is a diagram for explaining input circuit information.

In the second embodiment, the input circuit information which is input in the step 1 is, for example, information amounting to one net shown in FIG. 5. The input circuit information shown in FIG. 5 includes a driver with a resistance RO=20 Ohms (Ω), a wiring having a wiring length L=20 mm and an impedance ZO=60 Ohms, a resistor having a resistance Rs=10 Ohms, a wiring having a wiring length L=150 mm and an impedance Z0=60 Ohms, and a receiver. In this case, a dock frequency of the net, a delay between pins, a signal propagation speed on a pattern, a layer structure, a pattern width and the like may be input in addition to the input circuit information shown in FIG. 5.

The step 3 obtains the recommended circuit information which is considered to minimize the noise using the at least one calculation formula, based on the input circuit information. It will be assumed for the sake of convenience that the recommended circuit information which is obtained based on the input circuit information shown in FIG. 5 includes a damping resistance. For example, when the step 8 calculates based on the input circuit information shown in FIG. 5 that a damping resistance at which a first rising voltage of an input waveform matches a maximum voltage VIH-2 which guarantees a normal operation of the circuit is 12 Ohms, and a damping resistance at which the first rising voltage of the input waveform matches a minimum voltage VIH-1 which guarantees the normal operation of the circuit is 67 Ohms, the damping resistance of the recommended circuit information becomes 12 to 67 Ohms.

Figure 6:
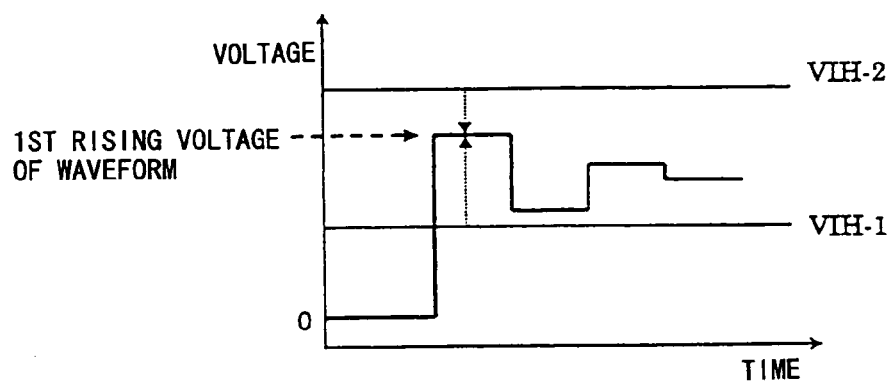
FIG. 6 is a diagram showing a relationship of a first rising voltage, and a maximum voltage and a minimum voltage of a circuit.

FIG. 6 is a diagram showing a relationship of the first rising voltage, and the maximum voltage VIH-2 and the minimum voltage VIH-1 of the circuit. In FIG. 6, the ordinate indicates the voltage, and the abscissa indicates the time. In this case, the step 5 obtains, as the noise countermeasures, a damping resistance which makes the first rising voltage indicated by a dotted line in FIG. 6 to fall within a range less than or equal to the maximum voltage VIH-2 and greater than or equal to the minimum voltage VIH-1. In other words, because the damping resistance of the input circuit information is 10 Ohms and the damping resistance of the recommended circuit information is 12 to 67 Ohms, the step 5 compares the damping resistances and determines the noise countermeasures as being to modify the damping resistance of the input circuit information to the damping resistance of the recommended circuit information, which is 12 to 67 Ohms.

Figure 7:
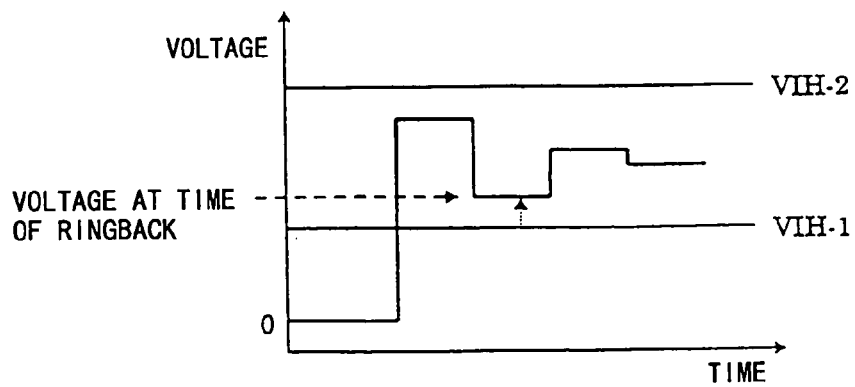
FIG. 7 is a diagram for explaining a relationship of the voltage and the minimum voltage of the circuit at a time of a ringback.

When calculating the damping resistance based on the input circuit information shown in FIG. 5, it is possible to take into consideration a voltage at the time of a ringback. It is assumed for the sake of convenience that a damping resistance at which the voltage at the time of the ringback matches the minimum voltage VIH-1 of the circuit is calculated to be 14 Ohms. In this case, a damping resistance at which the first rising voltage of the input waveform matches the maximum rated voltage of the circuit is 12 Ohms, but the damping resistance of 14 Ohms at the time of the ringback is used as a minimum value of the damping resistance. Hence, the damping resistance of the recommended circuit information becomes 14 to 67 Ohms. FIG. 7 is a diagram showing a relationship of the voltage at the time of the ringback and the minimum voltage VIH-1 of the circuit. In FIG. 7, the ordinate indicates the voltage, and the abscissa indicates the time. Accordingly, the noise countermeasures, that is, the damping resistance, are determined in this case so that in addition to the first rising voltage, the voltage at the time of the ringback indicated by a dotted line in FIG. 7 falls within a range greater than or equal to the minimum voltage VIH-1 of the circuit.

Figure 8:
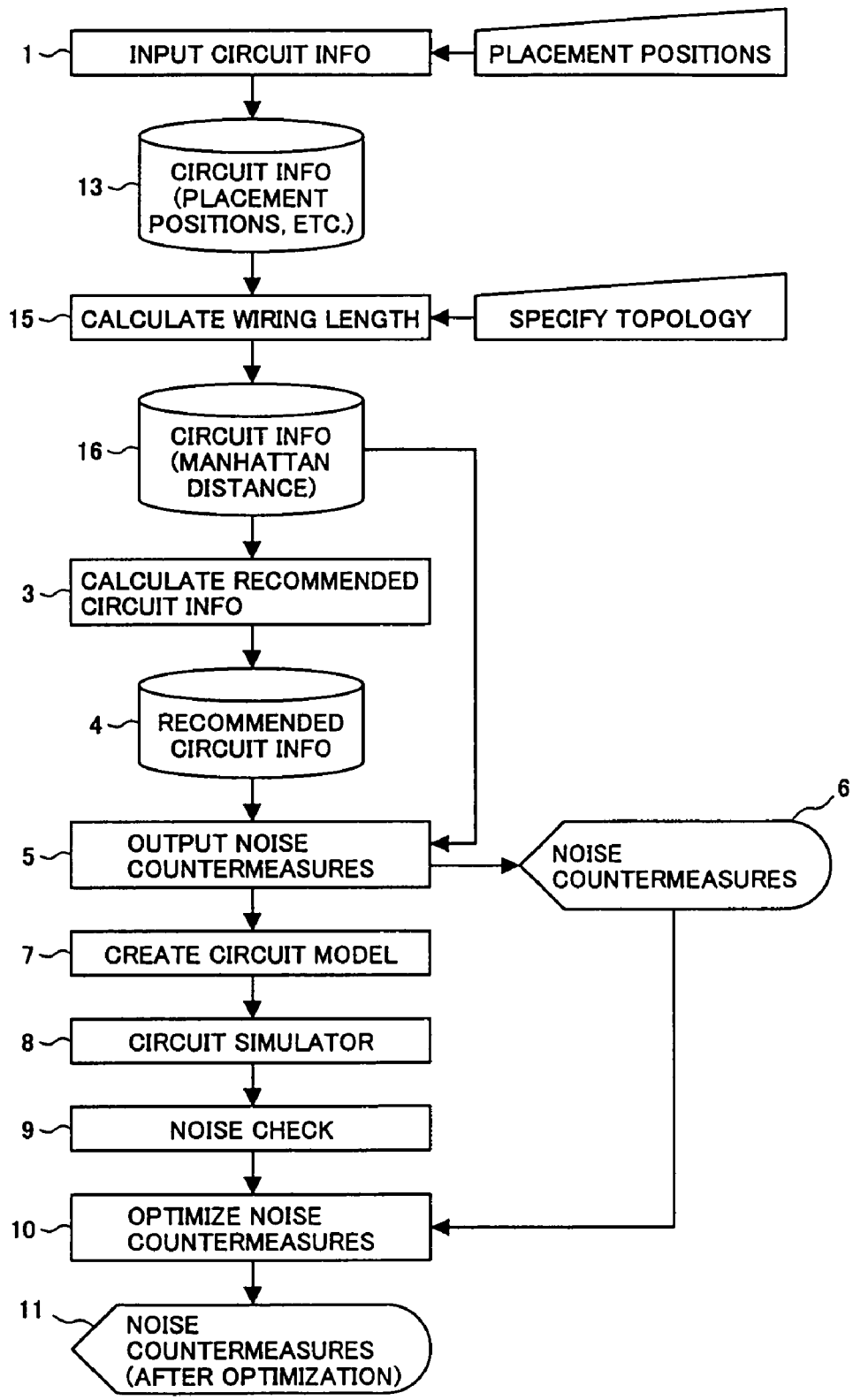
FIG. 8 is a flow chart for explaining a noise countermeasure determination process of the CPU in a third embodiment of the present invention.

FIG. 8 is a flow chart for explaining a noise countermeasure determination process of the CPU 201 of the computer system 100 which is applied with a third embodiment of the noise countermeasure determination method, a third embodiment of the noise countermeasure determination apparatus and a third embodiment of the computer-readable storage medium according to the present invention. In FIG. 8, those steps which are the same as those corresponding steps in FIG. 4 are designated by the same reference numerals, and a description thereof will be omitted. In order to omit input of routing and wiring length information when inputting the input circuit information, this third embodiment inputs positions of part pins such as input/output (I/O) buffers forming the circuit, and uses a Manhattan distance which is obtained from the positions of the part pins and the wiring topology, as the wiring length.

In FIG. 8, in order to omit the input of the routing and wiring length information, the step 1 inputs the positions of the part pins forming the circuit, that is, the placement positions, as the input circuit information. Hence, a step 13 stores the placement positions, as the input circuit information, in a storage means such as the memory part 202. A step 15 calculates, as the wiring length, the Manhattan distance or a provisional wiring length based on the placement positions which are read from the memory part 202 as the input circuit information and the specified wiring topology. A step 16 stores the calculated wiring length, as the circuit information, in a storage means such as the memory part 202. Hence, the step 3 in this embodiment calculates the recommended circuit information based on the wiring length, that is, the Manhattan distance.

Figure 9:
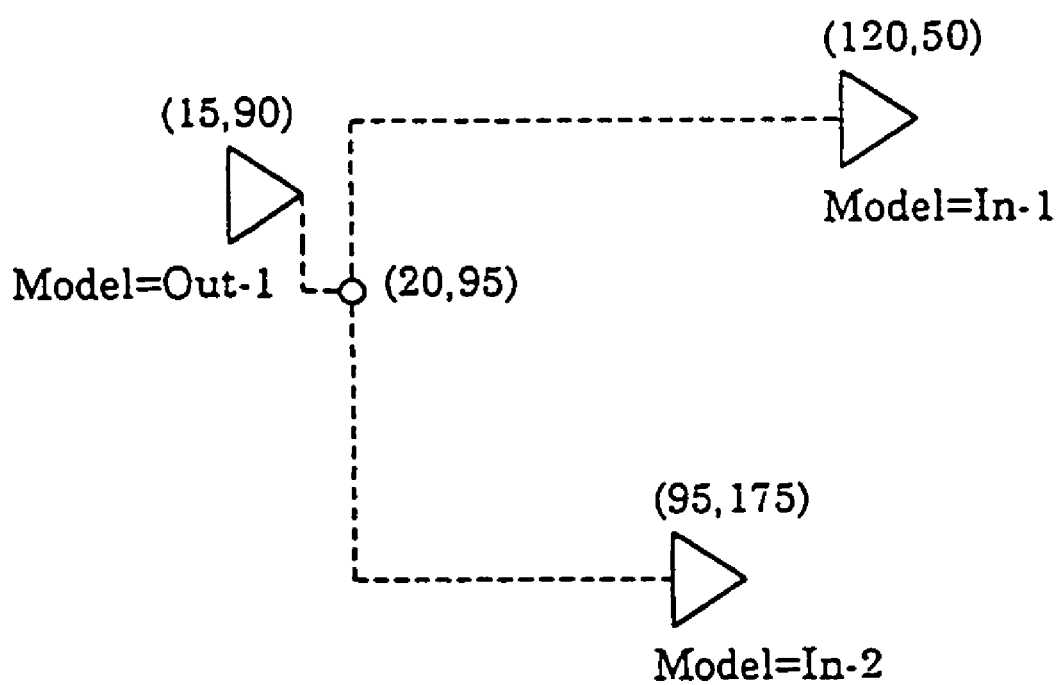
FIG. 9 is a diagram showing a case where placement positions of input/output buffers are input without routing of wirings.

Next, a description will be given of a case where the Manhattan distance which is obtained from the placement positions of the input/output buffers and the wiring topology, as the wiring length. FIG. 9 is a diagram showing a case where the placement positions of the input/output buffers are input without routing of the wirings. In FIG. 9, coordinates indicated in brackets indicate placement positions of the input/output buffers. In this case, an output buffer (driver) is placed at the coordinate (15, 90), and an input buffer (receiver) is placed at each of the coordinates (120, 50) and (95, 175). When a "star type" wiring topology is specified, the step 15 first calculates the position of a branching point as being (20, 95) so as to suit the wiring topology. In other words, since the specified wiring topology is the "star type", the position of the branching point is determined so that the Manhattan distance from the branching point to the receiver becomes the same for the two receivers and the distance from the driver to the branching point becomes as short as possible. In the case shown in FIG. 9, the wiring length from the driver to the branching point is calculated as being 15 mm, and the wiring length from the driver to each of the two receivers is calculated as being 150 mm, from the Manhattan distance, when the units of the coordinates are regarded as being in mm. Thereafter, these wiring lengths are used as the wiring length of the input circuit information.

In a modification, the wiring topology is not specified, the selectable wiring topologies are defined in advance, and the wiring length is calculated from the Manhattan distance by successively changing the wiring topology. In this case, the selectable wiring topologies may include the "star type", "load concentration type", "daisy chain" type, "H-type" and the like.

Figure 10:
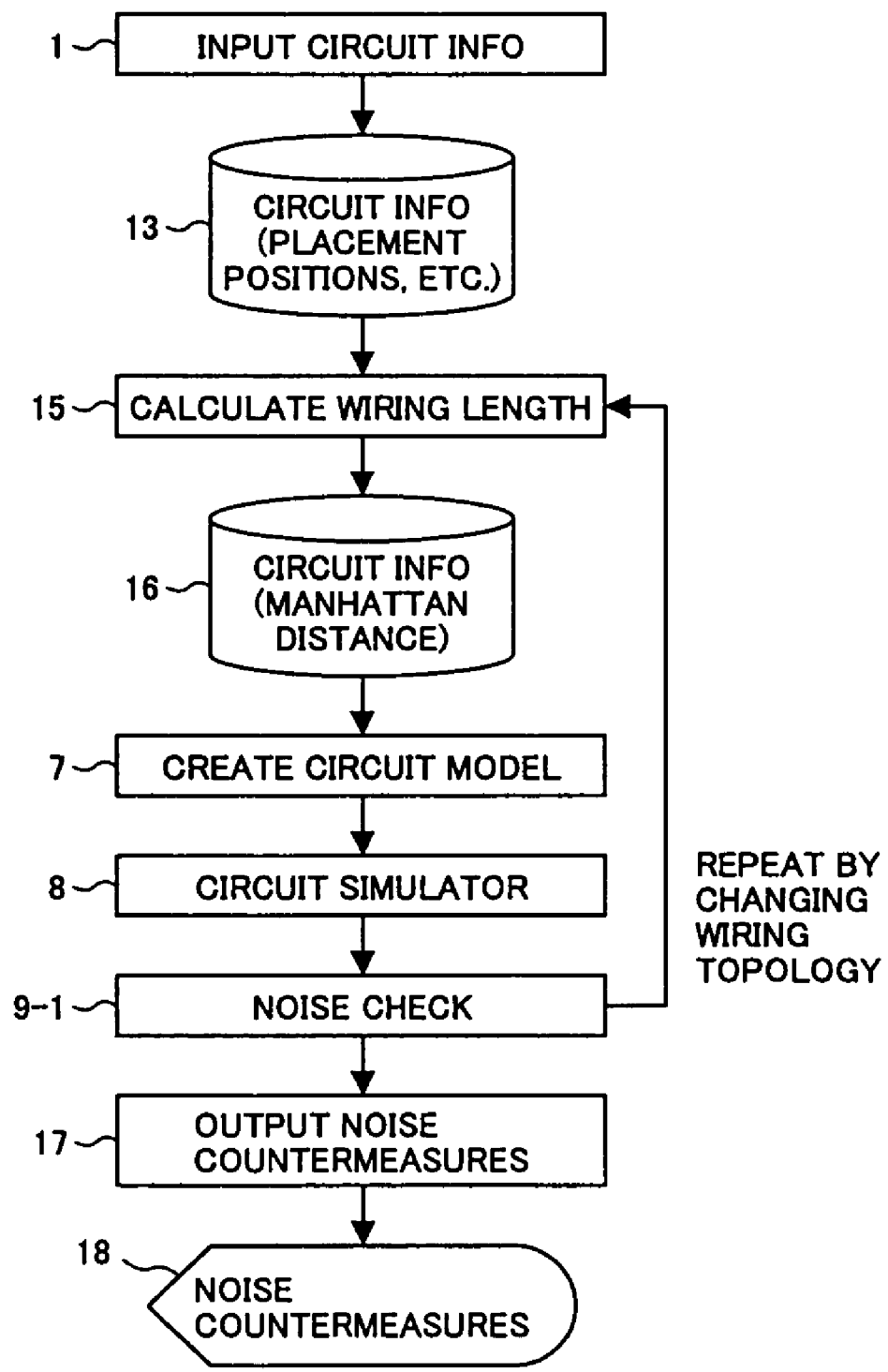
FIG. 10 is a flow chart for explaining a noise countermeasure determination process of the CPU in a fourth embodiment of the present invention.

FIG. 10 is a flow chart for explaining a noise countermeasure determination process of the CPU 201 of the computer system 100 which is applied with a fourth embodiment of the noise countermeasure determination method, a fourth embodiment of the noise countermeasure determination apparatus and a fourth embodiment of the computer-readable storage medium according to the present invention. In FIG. 10, those steps which are the same as those corresponding steps in FIG. 8 are designated by the same reference numerals, and a description thereof will be omitted. In this fourth embodiment, the wiring topology is not specified, and the processes up to the noise check are repeated using all selectable wiring topologies, so as to determine an optimum wiring topology from the results of the noise check.

In FIG. 10, the step 15 calculates, as the wiring length, the Manhattan distance based on the placement positions read from the memory part 202 as the input circuit information and a first wiring topology of the selectable wiring topologies. A step 9-1 carries out a noise check, and decides whether or not a selectable wiring topology remains. The process returns to the step 15 if the decision result in the step 9-1 is YES. Hence, the steps 15, 16, 7, 8 and 9-1 are repeated until no more selectable wiring topology remains and the decision result in the step 9-1 becomes NO. As a result, a step 17 obtains the optimum wiring topology as the noise countermeasures, based on the results of the repeated noise checks, and a step 18 outputs the optimum wiring topology which is obtained.

Figure 11:
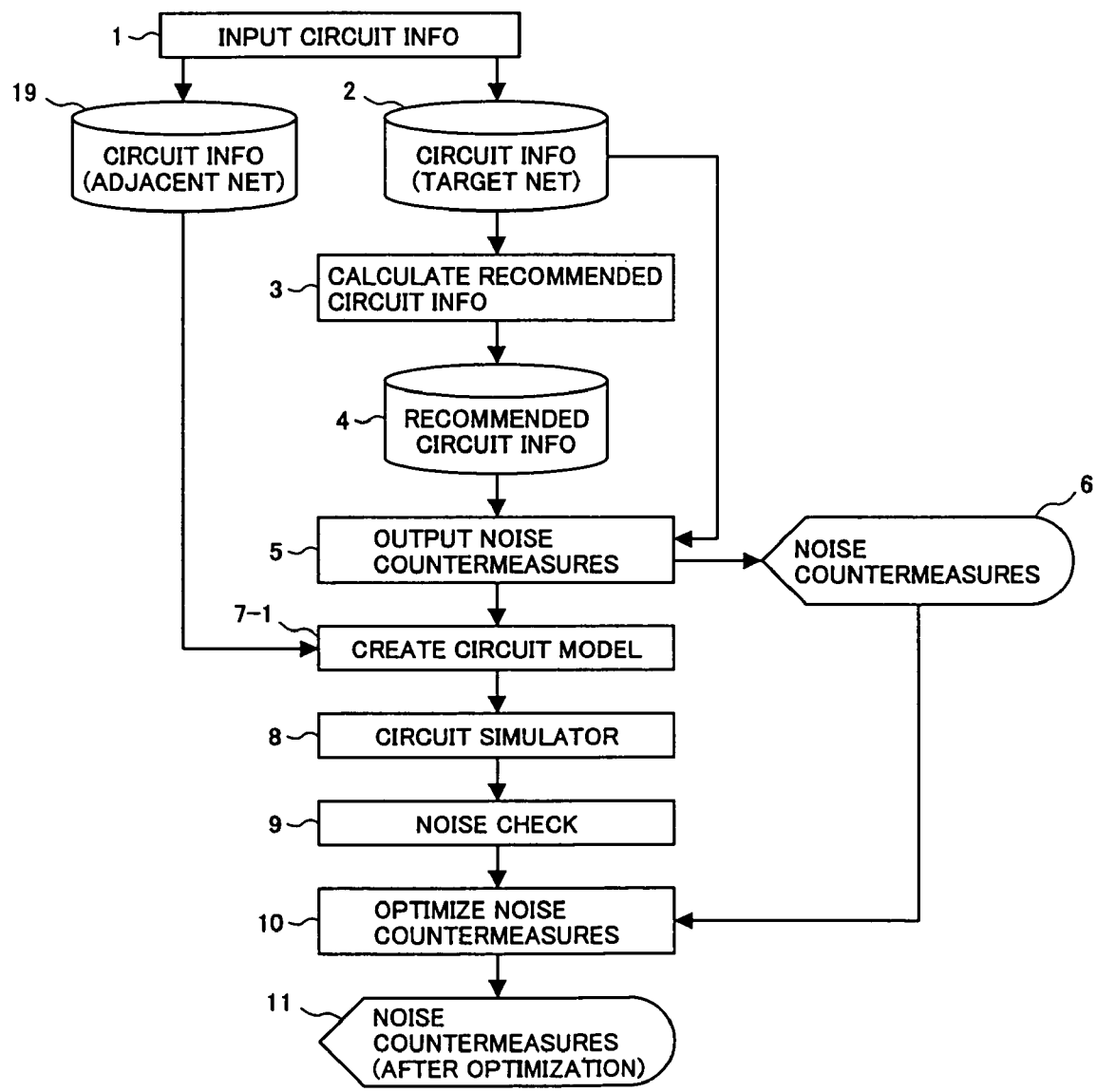
FIG. 11 is a flow chart for explaining a noise countermeasure determination process of the CPU in a fifth embodiment of the present invention.

FIG. 11 is a flow chart for explaining a noise countermeasure determination process of the CPU 201 of the computer system 100 which is applied with a fifth embodiment of the noise countermeasure determination method, a fifth embodiment of the noise countermeasure determination apparatus and a fifth embodiment of the computer-readable storage medium according to the present invention. In FIG. 11, those steps which are the same as those corresponding steps in FIG. 8 are designated by the same reference numerals, and a description thereof will be omitted. In this fifth embodiment, the noise check which is carried out takes into consideration a crosstalk noise.

In FIG. 11, of the input circuit information input by the step 1, circuit information related to a target net which is the target of the analysis is stored in a storage means such as the memory part 202 in the step 2, and the circuit information related to an adjacent net which is adjacent to the target net is stored in a storage means such as the memory part 202 in a step 19. A step 7-1 creates a simulation model of the target net and the adjacent net. Accordingly, the step 19 carries out a circuit simulation based on this simulation model, to calculate a propagation signal waveform and a crosstalk noise waveform of the target net, and to obtain a noise combined waveform by combining the propagation signal waveform and the crosstalk noise waveform. In addition, the step 9 carries out a noise check based on the noise combined waveform.

Figure 12:
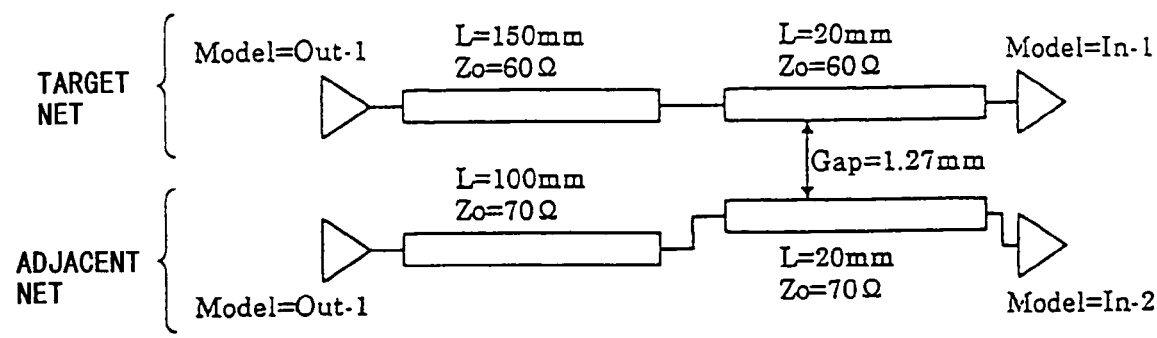
FIG. 12 is a diagram for explaining circuit information of a target net and an adjacent net.

FIG. 12 is a diagram for explaining circuit information of the target net and the adjacent net. As shown in FIG. 12, a crosstalk portion which should consider the crosstalk is specified within the net, and a pattern gap is input together with the circuit information. In this case, the circuit information of the target net includes a driver, a wiring having a wiring length L=150 mm and an impedance Z0=60 Ohms, a wiring having a wiring length L=20 mm and an impedance Z0=60 Ohms, and a receiver. The circuit information of the adjacent net includes a driver, a wiring having a wiring length L=100 mm and an impedance Z0=70 Ohms, a wiring having a wiring length L=20 mm and an impedance Z0=70 Ohms, and a receiver. In addition, a pattern gap Gap between the target and adjacent nets is Gap=1.27 mm. The step 8 creates a model of the crosstalk portion when creating the model of the circuit simulator, and obtains the noise combined waveform by combining the propagation signal waveform of the target net and the crosstalk noise waveform output from the circuit simulator. The noise check is carried out based on the noise combined waveform.

Figure 13:
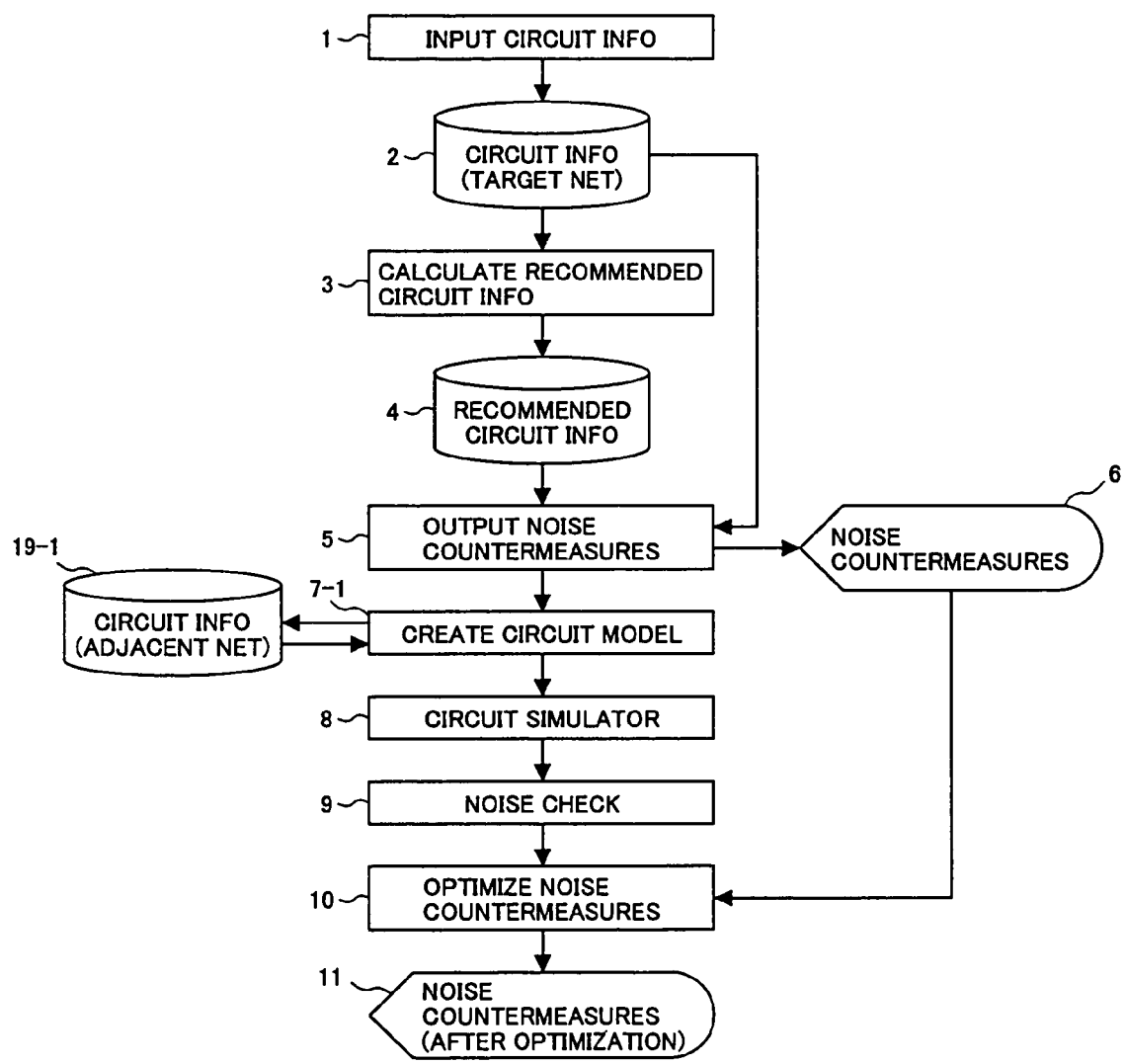
FIG. 13 is a flow chart for explaining a noise countermeasure determination process of the CPU in a sixth embodiment of the present invention.

FIG. 13 is a flow chart for explaining a noise countermeasure determination process of the CPU 201 of the computer system 100 which is applied with a sixth embodiment of the noise countermeasure determination method, a sixth embodiment of the noise countermeasure determination apparatus and a sixth embodiment of the computer-readable storage medium according to the present invention. In FIG. 13, those steps which are the same as those corresponding steps in FIG. 11 are designated by the same reference numerals, and a description thereof will be omitted. In this sixth embodiment, instead of inputting the circuit information of the adjacent net, a simulation model is created by assuming that a net having the same structure as the target net is adjacent to the target net with a constant pattern gap formed therebetween.

In FIG. 13, a step 19-1 stores the circuit information related to the target net, as the circuit information related to the adjacent net which is adjacent to the target net, in a storage means such as the memory part 202. In other words, the circuit information of the adjacent net is automatically generated by assuming that the net having the same structure as the target net is adjacent to the target net with the constant pattern gap formed therebetween. The step 7-1 creates the simulation models of the target net and the adjacent net using the circuit information of the adjacent net.

Figure 14:
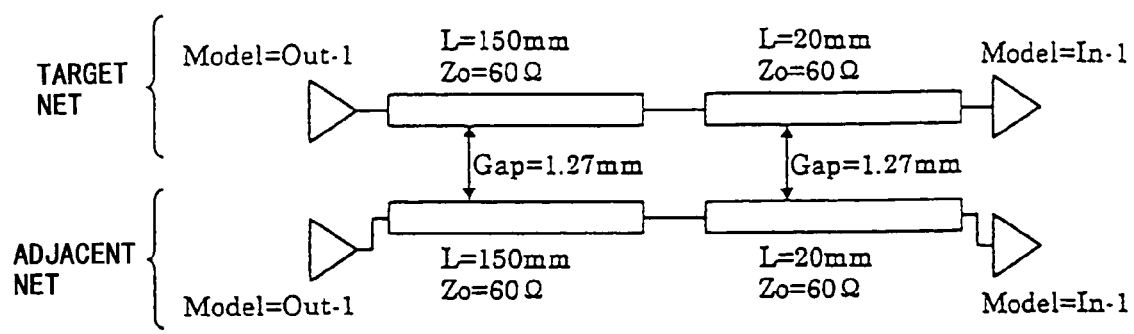
FIG. 14 is a diagram for explaining circuit information of a target net and an adjacent net.

FIG. 14 is a diagram for explaining the circuit information of the target net and the adjacent net. As shown in FIG. 14, a crosstalk portion which should consider the crosstalk is specified within the net, and the circuit information of the adjacent net is automatically generated by assuming that the net having the same structure as the target net is adjacent to the target net with the constant pattern gap formed therebetween. In this case, the circuit information of the target net includes a driver, a wiring having a wiring length L=150 mm and an impedance Z0=60 Ohms, a wiring having a wiring length L=20 mm and an impedance Z0=60 Ohms, and a receiver. The circuit information of the adjacent net, which is automatically generated, includes a driver, a wiring having a wiring length L=150 mm and an impedance Z0=60 Ohms, a wiring having a wiring length L=20 mm and an impedance Z0=60 Ohms, and a receiver. In addition, a pattern gap Gap between the target and adjacent nets is Gap=1.27 mm. The step 8 creates a model of the crosstalk portion when creating the model of the circuit simulator, and obtains the noise combined waveform by combining the propagation signal waveform of the target net and the crosstalk noise waveform output from the circuit simulator. The noise check is carried out based on the noise combined waveform.

Figure 15:
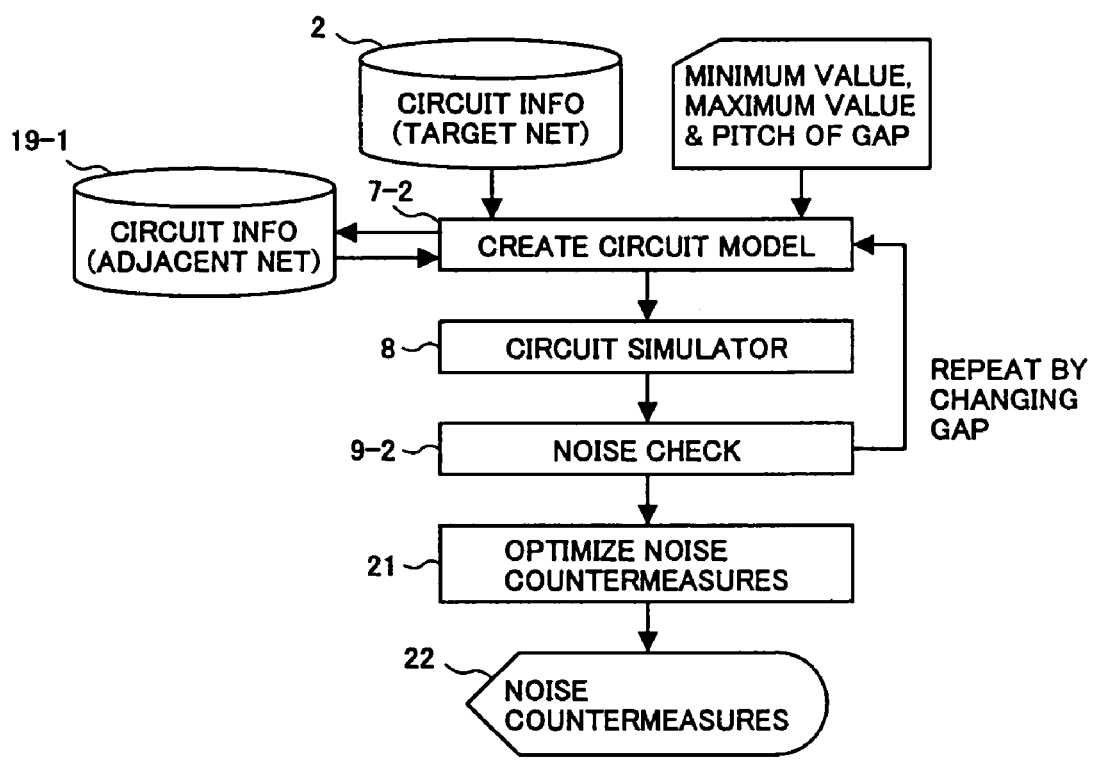
FIG. 15 is a flow chart for explaining a noise countermeasure determination process of the CPU in a seventh embodiment of the present invention.

FIG. 15 is a flow chart for explaining a noise countermeasure determination process of the CPU 201 of the computer system 100 which is applied with a seventh embodiment of the noise countermeasure determination method, a seventh embodiment of the noise countermeasure determination apparatus and a seventh embodiment of the computer-readable storage medium according to the present invention. In FIG. 15, those steps which are the same as those corresponding steps in FIG. 13 are designated by the same reference numerals, and a description thereof will be omitted. In this seventh embodiment, the processes from the creation of the simulation model up to the noise check are repeated while changing the pattern gap between the target net and the adjacent net, so as to obtain and output as the noise countermeasures a minimum pattern gap which makes the noise fall within the tolerable range.

In FIG. 15, a step 7-2 creates a simulation model based on a maximum value, a minimum value and a pitch of the pattern gap between the target net and the adjacent net, in addition to the circuit information of the target net and the circuit information of the adjacent net. Further, a step 9-2 creates the circuit information of the adjacent net using the minimum value of the pattern gap, and carries out a noise check by taking the crosstalk into consideration. If the noise exceeds a tolerable range as a result of the noise check, the pattern gap is increased by an amount corresponding to the pitch, and the process returns to the step 7-2. Therefore, the steps 7-2, 8 and 9-2 are repeated until the noise falls within the tolerable range. Then, a step 21 obtains, as the noise countermeasures, a minimum pattern gap which makes the noise fall within the tolerable range. In addition, a step 22 outputs the noise countermeasures which are obtained.

The processes of each of the embodiments described above may be carried out based on data of the circuit design or, data of the assemble design. Moreover, by executing all selectable combinations, similarly to the noise measure determination method which outputs the wiring topology as the noise countermeasures, optimum resistance, branching length, characteristic impedance of the wiring, wiring pattern width and the like may be output as the noise countermeasures.

Next, a description will be given of the recommended circuit information and the noise countermeasures which are obtained with respect to particular input circuit information. In the following description, it is assumed for the sake of convenience that the recommended circuit information and the noise countermeasures are obtained by the third embodiment shown in FIG. 8.

Figure 16:
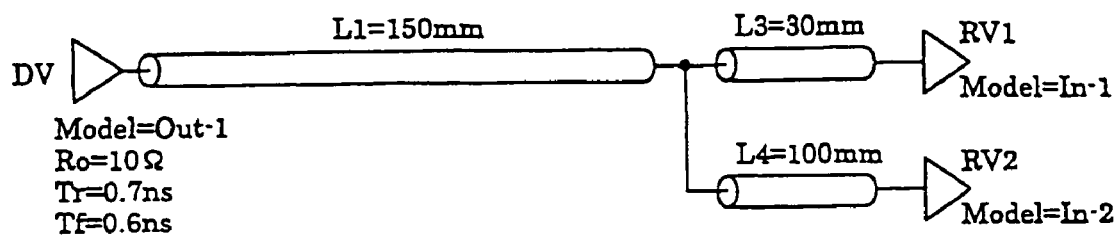
FIG. 16 is a diagram showing input circuit information.

FIG. 16 is a diagram showing particular input circuit information. In this case, the wiring topology is the load concentration type, and a characteristic impedance Z0 of the wiring pattern is Z0=60 Ohms, and a transmission delay time Td of the wiring pattern is Td=7.0 ns/m. The input circuit information includes a driver DV having an output resistance R0 of R0=10 Ohms, a rising time Tr of Tr=0.7 ns and a falling rime Tf of Tf=0.6 ns, a wiring having a wiring length L1 of L1=150 mm, a wiring having a wiring length L3 of L3=30 mm, a wiring having a wiring length L4 of L4=100 mm, a receiver RV1 and a receiver RV2.

Figure 17:
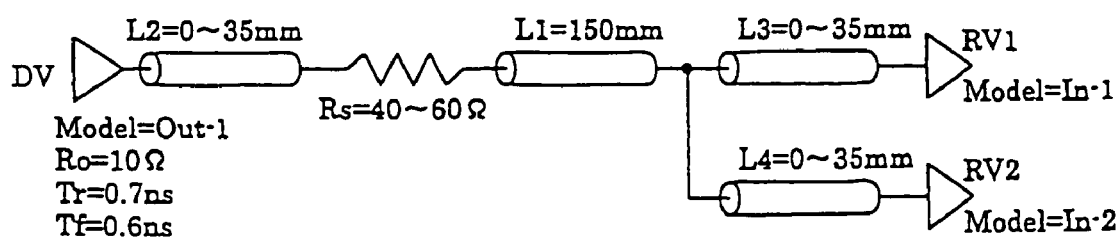
FIG. 17 is a diagram showing recommended circuit information with respect to the input circuit information shown in FIG. 16.

FIG. 17 is a diagram showing recommended circuit information which is obtained with respect to the input circuit information shown in FIG. 16. In the case of the recommended circuit information shown in FIG. 17, the wiring topology is the load concentration type, and a characteristic impedance Z0 of the wiring pattern is Z0=60 Ohms, and a transmission delay time Td of the wiring pattern is Td=7.0 ns/m. The recommended circuit information includes a driver DV having an output resistance R0 of R0=10 Ohms, a rising time Tr of Tr=0.7 ns and a falling rime Tf of Tf=0.6 ns, a wiring having a wiring length L2 of L2=0 to 35 mm, a damping resistor having a damping resistance Rs of Rs=40 to 60 Ohms, a wiring having a wiring length L1 of L1=150 mm, a wiring having a wiring length L3 of L3=0 to 35 mm, a wiring having a wiring length L4 of L4=0 to 35 mm, a receiver RV1 and a receiver RV2.

In this case, the recommended value of 40 Ohms≦Rs≦60 Ohms for the damping resistor is calculated from the characteristic impedance Z0 of the wiring and the output resistance R0 of the driver DV. The recommended value of 0≦L2≦35 mm for the wiring length L2 between the driver DV and the damping resistor is calculated from the transmission delay time Td of the wiring pattern and the rising time Tr and the falling time Tf of the driver DV. The recommended value of 0≦L3≦35 mm for the wiring length L2 between the branching point and the receiver RV1 is calculated from the transmission delay time Td of the wiring pattern and the rising time Tr and the falling time Tf of the driver DV. The recommended value of 0≦L4≦35 mm for the wiring length L4 between the branching point and the receiver RV2 is calculated from the transmission delay time Td of the wiring pattern and the rising time Tr and the falling time Tf of the driver DV.

The noise countermeasures are determined based on differences between the input circuit information shown in FIG. 16 and the recommended circuit information shown in FIG. 17. For example, the noise countermeasures determined in this case include adding a damping resistor Rs having a resistance of 40 to 60 Ohms at a position which is 0 to 35 mm from the driver DV, and changing the wiring length L4 between the branching point and the receiver RV2 to 0 to 35 mm.

Figure 18:
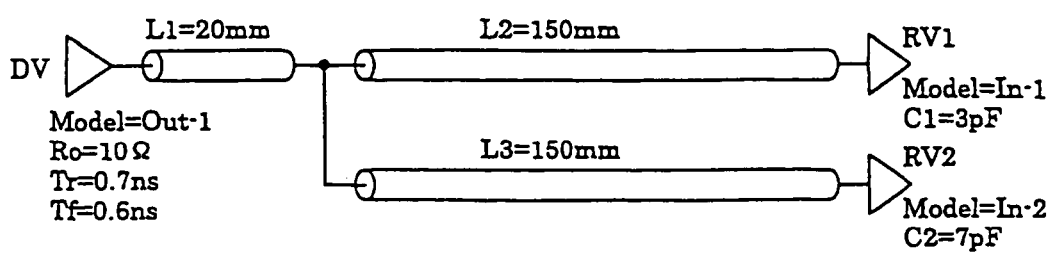
FIG. 18 is a diagram showing input circuit information.

FIG. 18 is a diagram showing another particular input circuit information. In this case, the wiring topology is the star type, and a characteristic impedance Z0 of the wiring pattern is Z0=60 Ohms, and a transmission delay time Td of the wiring pattern is Td=7.0 ns/m. The input circuit information includes a driver DV having an output resistance R0 of R0=10 Ohms, a rising time Tr of Tr=0.7 ns and a falling rime Tf of Tf=0.6 ns, a wiring having a wiring length L1 of L1=20 mm, a wiring having a wiring length L2 of L2=150 mm, a wiring having a wiring length L3 of L3=150 mm, a receiver RV1 having a load capacitance C1 of C1=3 pF, and a receiver RV2 having a load capacitance C2 of C2=7 pF.

Figure 19:
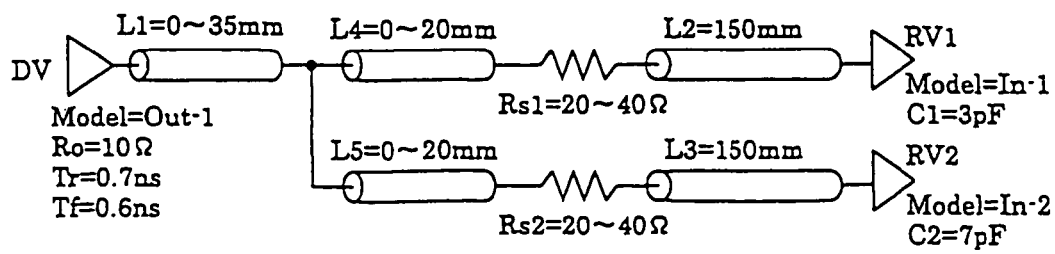
FIG. 19 is a diagram for explaining recommended circuit information with respect to the input circuit information shown in FIG. 18.

FIG. 19 is a diagram showing recommended circuit information which is obtained with respect to the input circuit information shown in FIG. 18. In the case of the recommended circuit information shown in FIG. 17, the wiring topology is the load concentration type, and a characteristic impedance Z0 of the wiring pattern is Z0=60 Ohms, and a transmission delay time Td of the wiring pattern is Td=7.0 ns/m. The recommended circuit information includes a driver DV having an output resistance R0 of R0=10 Ohms, a rising time Tr of Tr=0.7 ns and a falling rime Tf of Tf=0.6 ns, a wiring having a wiring length L1 of L1=0 to 35 mm, a wiring having a wiring length L4 of L4=0 to 20 mm, a wiring having a wiring length L5 of L5=0 to 20 mm, a damping resistor having a damping resistance Rs1 of Rs1=20 to 40 Ohms, a damping resistor having a damping resistance Rs2 of Rs2=20 to 40 Ohms, a wiring having a wiring length L2 of L2=150 mm, a wiring having a wiring length L3 of L3=150 mm, a receiver RV1 having a load capacitance C1 of C1=3 pF, and a receiver RV2 having a load capacitance C2 of C2=7 pF.

In this case, the recommended value (maximum value) of Rs1≦40 Ohms of the first damping resistor and the recommended value (maximum value) of Rs2≦40 Ohms for the second damping resistor are calculated from the characteristic impedance Z0 of the wiring and the output resistance R0 of the driver DV. In addition, the recommended value (minimum value) of 20 Ohms≦Rs1 of the first damping resistor and the recommended value (minimum value) of 20 Ohms≦Rs2 for the second damping resistor are calculated from the load capacitance C1 of the receiver RV1 and the load capacitance C2 of the receiver RV2. The recommended value of 0≦L1≦35 mm for the wiring length L1 between the driver DV and the branching point is calculated from the transmission delay time Td of the wiring pattern and the rising time Tr and the falling time Tf of the driver DV. The recommended value of 0≦L4≦20 mm for the wiring length L4 between the branching point and the first damping resistor (Rs1) is calculated from the transmission delay time Td of the wiring pattern and the rising time Tr and the falling time Tf of the driver DV. The recommended value of 0≦L5≦20 mm for the wiring length L5 between the branching point and the second damping resistor (Rs2) is calculated from the transmission delay time Td of the wiring pattern and the rising time Tr and the falling time Tf of the driver DV.

The noise countermeasures are determined based on differences between the input circuit information shown in FIG. 18 and the recommended circuit information shown in FIG. 19. For example, the noise countermeasures determined in this case include adding a damping resistor Rs1 having a resistance of 20 to 40 Ohms at a position which is between the branching point and the receiver RV1 and is 0 to 35 mm from the branching point, and adding a damping resistor Rs2 having a resistance of 20 to 40 Ohms at a position which is between the branching point and the receiver RV2 and is 0 to 35 mm from the branching point.

Figure 20:
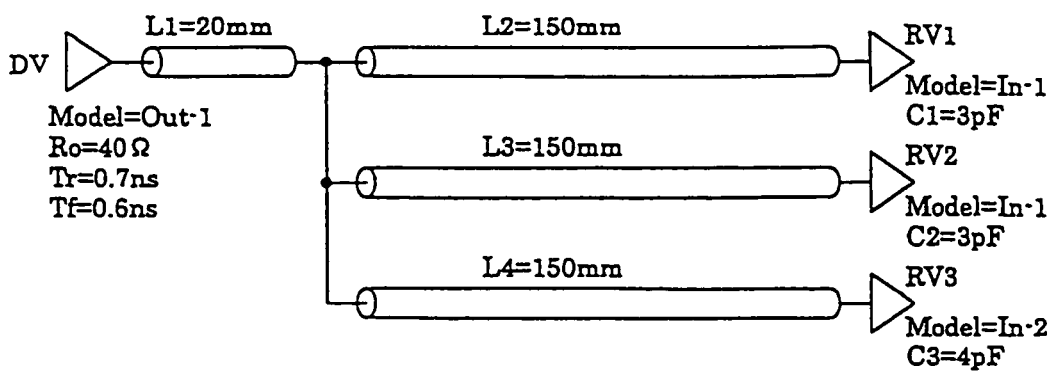
FIG. 20 is a diagram showing input circuit information.

FIG. 20 is a diagram showing still another particular input circuit information. In this case, the wiring topology is the star type, and a characteristic impedance Z0 of the wiring pattern is Z0=60 Ohms, and a transmission delay time Td of the wiring pattern is Td=7.0 ns/m. The input circuit information includes a driver DV having an output resistance R0 of R0=40 Ohms, a rising time Tr of Tr=0.7 ns and a falling rime Tf of Tf=0.6 ns, a wiring having a wiring length L1 of L1=20 mm, a wiring having a wiring length L2 of L2=150 mm, a wiring having a wiring length L3 of L3=150 mm, a wiring having a wiring length L4 of L4=150 mm, a receiver RV1 having a load capacitance C1 of C1=3 pF, a receiver RV2 having a load capacitance C2 of C2=3 pF, and a receiver rRV3 having a load capacitance C3 of C3=4 pF.

Figure 21:
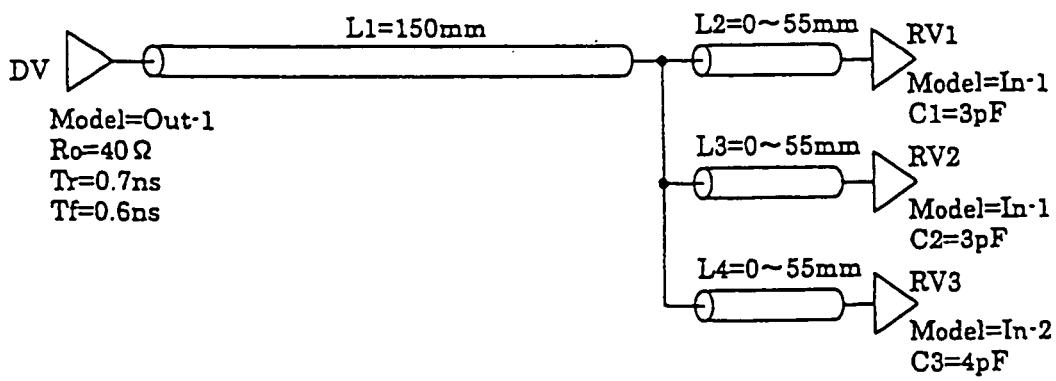
FIG. 21 is a diagram for explaining recommended circuit information with respect to the input circuit information shown in FIG. 20.

FIG. 21 is a diagram showing recommended circuit information which is obtained with respect to the input circuit information shown in FIG. 20. In the case of the recommended circuit information shown in FIG. 21, the wiring topology is the load concentration type, and a characteristic impedance Z0 of the wiring pattern is Z0=60 Ohms, and a transmission delay time Td of the wiring pattern is Td=7.0 ns/m. The recommended circuit information includes a driver DV having an output resistance R0 of R0=40 Ohms, a rising time Tr of Tr=0.7 ns and a falling rime Tf of Tf=0.6 ns, a wiring having a wiring length L1 of L1=0 to 150 mm, a wiring having a wiring length L2 of L2=0 to 55 mm, a wiring having a wiring length L3 of L3=0 to 55 mm, a wiring having a wiring length L4 of L4=0 to 55 mm, a receiver RV1 having a load capacitance C1 of C1=3 pF, a receiver RV2 having a load capacitance C2 of C2=3 pF, and a receiver RV3 having a load capacitance C3 of C3=4 pF.

In this case, the load concentration type is selected for the wiring topology, based on the characteristic impedance Z0 of the wiring which is Z0=60 Ohms, the output resistance R0 of the driver DV which is D0=40 Ohms, the number of receivers which is three in this case, and the load capacitances C1, C2 and C3 of the receivers RV1, RV2 and RV3 which are C1=C2=3 pF and C3=4 pF. The recommended value of L1=150 mm for the wiring length L1 between the driver DV and the branching point is calculated from the wiring topology and the wiring lengths L1, L2 and L3 which are L1=20 mm, L2=150 mm and L3=150 mm. The recommended value of $0 \leq L2 \leq 55$ mm for the wiring length L2 between the branching point and the receiver RV1 is calculated from the transmission delay time Td of the wiring pattern and the rising time Tr and the falling time Tf of the driver DV. The recommended value of $0 \leq L3 \leq 55$ mm for the wiring length L3 between the branching point and the receiver RV2 is calculated from the transmission delay time Td of the wiring pattern and the rising time Tr and the falling time Tf of the driver DV. The recommended value of $0 \leq L4 \leq 55$ mm for the wiring length L4 between the branching point and the receiver RV3 is calculated from the transmission delay time Td of the wiring pattern and the rising time Tr and the falling time Tf of the driver DV.

The noise countermeasures are determined based on differences between the input circuit information shown in FIG. 20 and the recommended circuit information shown in FIG. 21. For example, the noise countermeasures determined in this case include changing the wiring topology to the load concentration type, changing the wiring length L1 between the driver DV and the branching point to L1=150 mm, changing the wiring length L2 between the branching point and the receiver RV1 to L2=0 to 55 mm, changing the wiring length L3 between the branching point and the receiver RV2 to L3=0 to 55 mm, and changing the wiring length L4 between the branching point and the receiver RV3 to L4=0 to 55 mm.

Of course, the recommended circuit information is not limited to the information described above in conjunction with each of the embodiments. For example, the recommended circuit information may include a wiring length between a driver and a damping resistor, wiring lengths between a branching point and each of the receivers, differences between the wiring lengths between the driver and each of the receivers, a resistance of the damping resistor, an inserting position of the damping resistor, a resistance of a pull-up resistor, a resistance of a pull-down resistor, a pull-up voltage, a driving capacity of the driver, a number of loads such as the number of receivers provided with respect to one driver, a wiring topology and the like.

Figure 22:
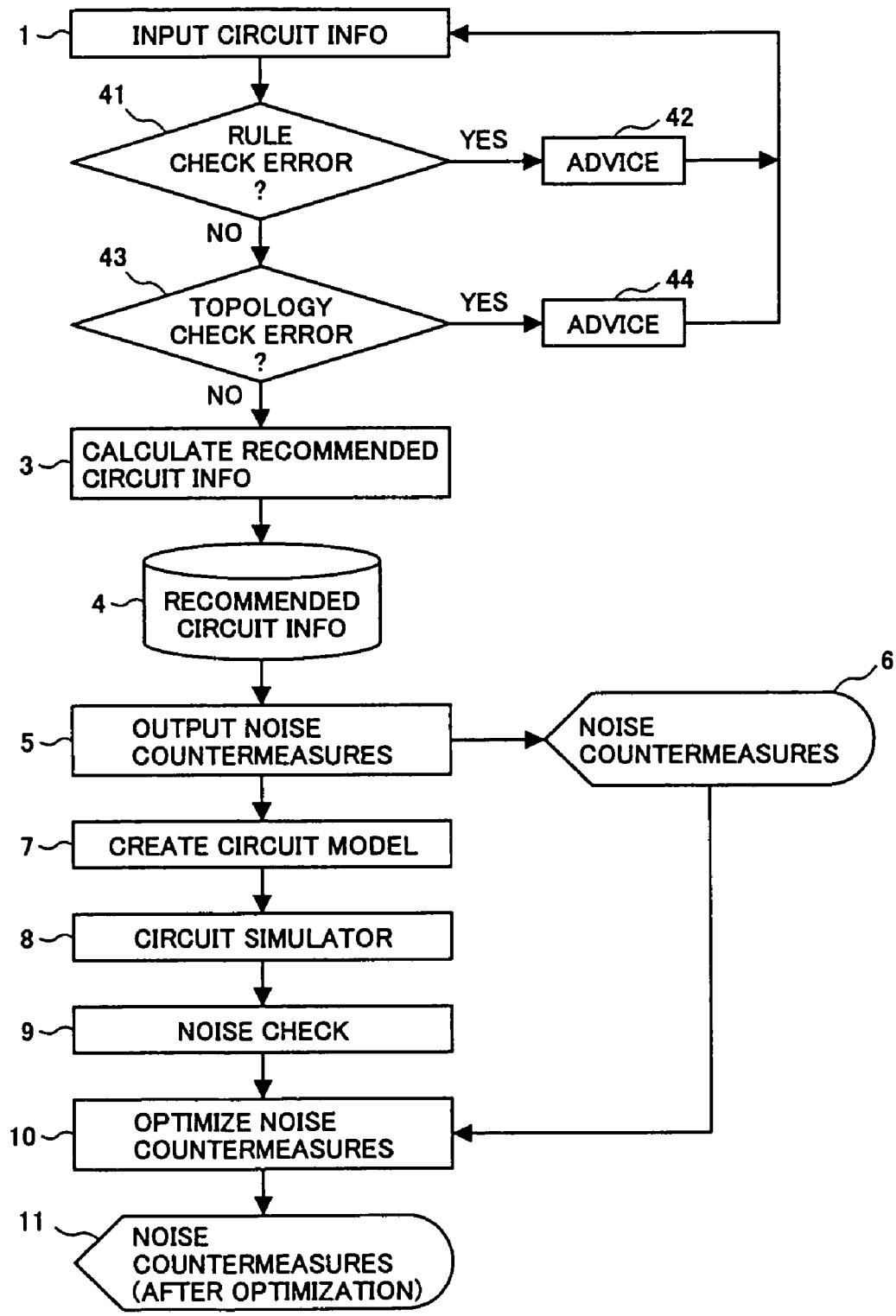
FIG. 22 is a flow chart for explaining a noise countermeasure determination process of the CPU in an eighth embodiment of the present invention.

FIG. 22 is a flow chart for explaining a noise countermeasure determination process of the CPU 201 of the computer system 100 which is applied with an eighth embodiment of the noise countermeasure determination method, an eighth embodiment of the noise countermeasure determination apparatus and an eighth embodiment of the computer-readable storage medium according to the present invention. In FIG. 22, those steps which are the same as those corresponding steps in FIG. 4 are designated by the same reference numerals, and a description thereof will be omitted. In this eighth embodiment, a rule check and a topology check are carried out with respect to the input circuit information. When an error is found during the rule check or the topology check, an advice for correcting the error is displayed, so as to reduce the time required to make the circuit correction and to improve the accuracy of the advice.

In FIG. 22, a step 41 carries out a rule check of the circuit (hereinafter simply referred to as a circuit rule check) with respect to the input circuit information, and decides whether or not a rule error is found. The circuit rule check includes checking a disconnection and a loop (short-circuit) of the wiring, checking the existence of an antenna wiring, and checking the logic such as whether or not the circuit consists only of a driver or only of a receiver, and whether or not no pull-up resistor is provided in an open-drain circuit. In other words, the circuit rule check makes common and basic checks of the circuit. As a result, it is possible to find the rule error of the input circuit information at an early stage of the noise countermeasure determination process. If the decision result in the step 41 is YES, a step 42 displays on the display 102 an advice indicating how the input circuit information should be corrected with respect to the rule error which is found. After the step 42, the process returns to the step 1, and the operator corrects the input circuit information so as to eliminate the rule error according to the advice.

On the other hand, if the decision result in the step 41 is NO, a step 43 carries out a topology check of the wiring (hereinafter simply referred to as a wiring topology check) with respect to the input circuit information, and decides whether or not a topology error is found. The wiring topology categorizes the wirings of the circuit into how the wirings are connected. The wiring topology includes the load concentration type including the 1:1 type, the star type, and the daisy chain type. For example, it is possible to obtain good characteristics such as good signal waveforms by employing one of such connection types for the wirings of the circuit. For this reason, by making a check to determine the wiring topology employed by the circuit and finding an erroneous portion which does not conform to the connection type, it is possible to find a topology error of the input circuit information at an early stage of the noise countermeasure determination process. If the decision result in the step 43 is YES, a step 44 displays on the display 102 an advice indicating how the input circuit information should be corrected with respect to the topology error which is found. After the step 44, the process returns to the step 1, and the operator corrects the input circuit information so as to eliminate the topology error according to the advice.

If the decision result in the step 43 is NO, the process advances to the step 3. In other words, when no error is found as a result of the circuit rule check and the wiring topology check which are made with respect to the input circuit information, the recommended circuit information is calculated as in the case of the second embodiment described above based on the checked input circuit information.

Of course, the order in which the steps 41 and 43 are carried out may be reversed. That is, it is possible to carry out the circuit rule check in the step 41 when no topology error exists as a result of the wiring topology check which is carried out in the step 43, and to advance the process to the step 3 when no rule error exists as a result of the circuit rule check.

Therefore, according to this embodiment, it is possible to find the rule error and the topology error at an early stage of the noise countermeasure determination process, as compared to the case where the input circuit information is corrected based on the result of the noise check which is carried out by the waveform analysis or the like in the step 9, for example. In addition, because the advice is displayed when one of the rule error and the topology error is found, it is possible to reduce the time required to correct the circuit and to improve the accuracy of the advice.

Figure 23:
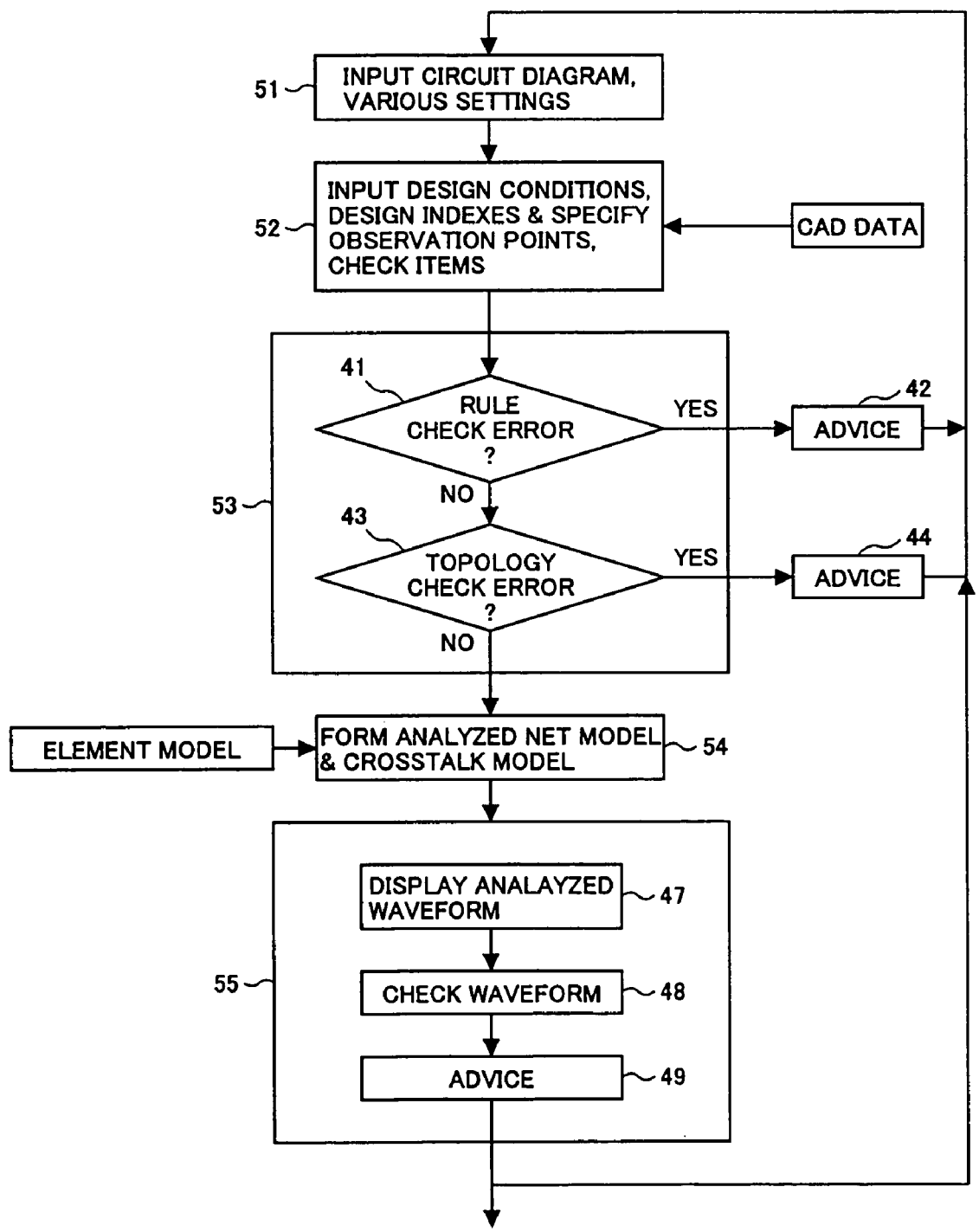
FIG. 23 is a flow chart for explaining a noise countermeasure determination process of the CPU in a ninth embodiment of the present invention.

FIG. 23 is a flow chart for explaining a noise countermeasure determination process of the CPU 201 of the computer system 100 which is applied with a ninth embodiment of the noise countermeasure determination method, a ninth embodiment of the noise countermeasure determination apparatus and a ninth embodiment of the computer-readable storage medium according to the present invention. In FIG. 23, those steps which are the same as those corresponding steps in FIG. 22 are designated by the same reference numerals, and a description thereof will be omitted. In this ninth embodiment, a rule check and a topology check are carried out with respect to the input circuit information. When an error is found during the rule check or the topology check, an advice for correcting the error is displayed, so as to reduce the time required to make the circuit correction and to improve the accuracy of the advice.

In FIG. 23, a step 51 inputs a circuit diagram and various settings. A step 52 inputs design conditions, inputs design indexes, specifies observation points, and specifies check items and the like. The information input or specified in the step 52 may be made based on CAD data. The steps 51 and 52 correspond to the step 1 shown in FIG. 22, and input the input circuit information.

A step 53 includes the steps 41 and 42, and also carries out a portion of the step 3 shown in FIG. 4. Accordingly, the results of the circuit rule check and the wiring topology check with respect to the input circuit information are obtained by the step 53.

A step 54 forms an analyzed net model and a crosstalk model of the input circuit information, based on the results obtained from the step 53, and creates a circuit model therefrom. This step 54 corresponds to the step 7 shown in FIG. 4.

A step 55 includes steps 47, 48 and 49. The step 47 analyzes the created circuit model using a circuit simulator. This step 47 corresponds to the step 8 shown in FIG. 4. The step 48 checks whether or not a noise which will cause a problem, that is, a noise which exceeds a tolerable range, is generated, based on the analysis results of the circuit simulator. Such a noise check may be made based on a signal waveform propagating through a wiring of the electronic circuit and output from the circuit simulator, by detecting a noise existing in the signal waveform. In addition, the step 48 may check the signal waveform analyzed in the step 47, so as to detect a portion which does not conform to the design conditions or an abnormal portion (erroneous portion) in the signal waveform. The step 48 corresponds to the step 9 shown in FIG. 4.

The step 49 categorizes the results of the noise check and optimizes the noise countermeasures, displays the optimized noise countermeasures on the display 102, and displays an advice on the display 102. The step 49 corresponds to the steps 10 and 11 shown in FIG. 4. Accordingly, based on information such as the degree of mismatch of the signal waveform and the design conditions, the kind of abnormality existing in the signal waveform and the voltage and time of the abnormality, the step 49 outputs, as the advice, the analysis results using an advice tree structure. Since an optimum solution for improving the abnormality of the signal waveform is prepared at a tip end of each branch of the advice tree structure, the optimum solutions with respect to the various abnormalities, including the noise, are automatically output as the advice. After the step 49, the process returns to the step 51, and the operator corrects the circuit depending on the advice which is output with respect to the abnormality.

Next, a description will be given of the judging contents of the rule check made in the step 41 and a corresponding advice made in the step 42. Of course, the judging contents and the corresponding advice are not limited to those described hereinafter. The advice corresponding to the judging contents is stored in the memory part 202, for example.

If the judging contents are "no floating element or pattern which is not connected to a target driver exists", for example, the corresponding advice output in the step 42 for the case where the decision result in the step 41 is YES is "delete floating element or pattern". If the judging contents are "no loop pattern exists", the corresponding advice output in the step 42 for the case where the decision result in the step 41 is YES is "delete loop". If the judging contents are "no antenna pattern exists", the corresponding advice output in the step 42 for the case where the decision result in the step 41 is YES is "delete antenna". If the judging contents are "net is not directly connected to a power source or ground", the corresponding advice output in the step 42 for the case where the decision result in the step 41 is YES is "delete power source or ground directly connected to the net". If the judging contents are "one or more receivers exist", the corresponding advice output in the step 42 for the case where the decision result in the step 41 is YES is "add receiver". If the judging contents are "one or more elements capable of becoming a driver exist", the corresponding advice output in the step 42 for the case where the decision result in the step 41 is YES is "add a driver". Furthermore, if the judging contents are "check number of loads: the recommended number of loads should be satisfied", the corresponding advice output in the step 42 for the case where the decision result in the step 41 is YES is "change to a driver having a larger driving capacity or, reduce the number of loads to a number smaller than the recommended number of loads".

Next, a description will be given of the judging contents of the topology check made in the step 43 and the corresponding advice made in the step 44. Of course, the judging contents and the corresponding advice are not limited to those described hereinafter. The advice corresponding to the judging contents is stored in the memory part 202, for example.

FIG. 24 is a diagram showing a load concentration type wiring topology for a unidirectional transmission. In the case of such a load concentration type wiring topology, if the judging contents are "the number of resistors connected in series is one or less in the case of a 1:1 type unidirectional transmission", the corresponding advice output in the step 44 for the case where the decision result in the step 43 is YES is "a damping resistor is redundant if an excess resistor is connected in series, and thus, maintain the resistor connected in series closest to a driver and delete other resistors". In addition, if the judging contents are "the number of resistors connected in series between a target driver and a first branching point is one or less in the case of a 1:1 type unidirectional transmission", the corresponding advice which is output in the step 44 in the case where the decision result in the step 43 is YES is "a damping resistor is redundant if an excess resistor is connected in series, and thus, maintain the resistor connected in series closest to a driver and delete other resistors".

FIGS. 25A and 25B respectively are diagrams showing a star type wiring topology for the unidirectional transmission. Both FIGS. 25A and 25B show the star type wiring topologies. In the case of the start type wiring topologies such as those shown in FIGS. 25A and 25B, if the judging contents are "the number of damping resistors after each branching point is one or less", the corresponding advice output in the step 44 for the case where the decision result in the step 43 is YES is "match the number of damping resistors to one if two or more damping resistors exist after the branching point".

Figure 26A:
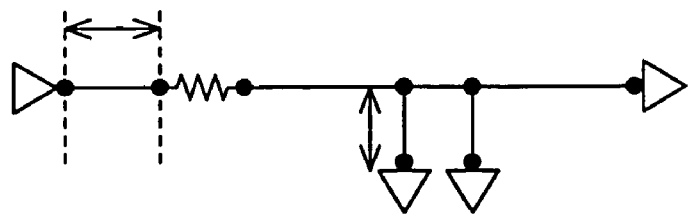
FIGS. 26A and 26B respectively are diagrams showing a daisy chain type wiring topology for the unidirectional transmission.
Figure 26B:
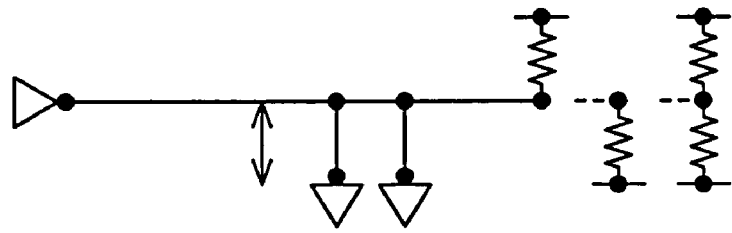

FIGS. 26A and 26B respectively are diagrams showing a daisy chain type wiring topology for the unidirectional transmission. Both FIGS. 26A and 26B show the daisy chain type wiring topologies. In the case of the daisy chain type wiring topology such as that shown in FIG. 26A, if the judging contents are "the number of damping resistors between a target driver and a first branching point is one or less", the corresponding advice output in the step 44 for the case where the decision result in the step 43 is YES is "a damping resistor is redundant if an excess resistor is connected in series, and thus, maintain the resistor connected in series closest to a driver and delete other resistors". In addition, in the case of the daisy chain type wiring topology such as that shown in FIG. 26B, if the judging contents are "a length of a wiring branching from a main wiring satisfies a predetermined formula", the corresponding advice output in the step 44 for the case where the decision result in the step 43 is YES is "make the length of the wiring less than or equal to a predetermined length if the judging contents are not satisfied".

According to the eighth and ninth embodiments described above, the check is carried out in steps with respect to the input circuit information, and an appropriate advice is output when an error is found. For this reason, it is possible to find the error at an early stage of the noise countermeasure determination process and urge the operator to correct the circuit, thereby efficiently reducing the time required to correct the circuit.

Further, the present invention is not limited to these embodiments, but various variations and modifications may be made without departing from the scope of the present invention.

What is claimed is:

1. A noise countermeasure determination method comprising:
   calculating recommended circuit information considered to minimize a noise by use of at least one formula, based on input circuit information amounting to at least one net of a target circuit which is to be subjected to a noise analysis; and
   comparing the input circuit information and the recommended circuit information, and determining a differing portion of the recommended circuit information differing from the input circuit information, as noise countermeasures.

2. The noise countermeasure determination method as claimed in claim 1, further comprising:
   creating a simulation model of the input circuit information after determining the noise countermeasures;
   carrying out a circuit simulation using the simulation model, to calculate a signal waveform propagating through a wiring of the target circuit and to check whether or not a noise exceeding a tolerable range exists in the signal waveform; and
   categorizing the noise existing as a result of the noise check, and optimizing the determined noise countermeasures to only portions related to the noise.

3. The noise countermeasure determination method as claimed in claim 1, wherein the calculating recommended circuit information comprises outputting a range of a damping resistance as the recommended circuit information, based on a minimum voltage VIH-1 and a maximum voltage VIH-2 which guarantee a normal operation of the target circuit, by taking a damping resistance which makes a first rising voltage of an input waveform at a receiving end of the target circuit equal to the minimum voltage VIH-1 as a maximum value of the range, and taking a damping resistance which makes the first rising voltage of the input waveform at the receiving end of the target circuit equal to the maximum voltage VIH-2 as a minimum value of the range.

4. The noise countermeasure determination method as claimed in claim 3, wherein the calculating recommended circuit information comprises:
   comparing a damping resistance which makes a voltage at a time of a ringback equal to the minimum voltage VIH-1 and the minimum value of the damping resistance, and
   outputting a larger one of the compared values as the minimum value of the damping resistance.

5. The noise countermeasure determination method as claimed in claim 1, further comprising outputting input circuit information that includes a wiring length that is substantially a Manhattan distance that is determined based on positions of part pins forming the target circuit and a wiring topology.

6. The noise countermeasure determination method as claimed in claim 5, further comprising:
   creating a simulation model of the input circuit information after determining the noise countermeasures;
   carrying out a circuit simulation using the simulation model, to calculate a signal waveform propagating through a wiring of the target circuit and to check whether or not a noise exceeding a tolerable range exists in the signal waveform; and
   repeating the creating a simulation model and the carrying out a circuit simulation using the simulation model using a plurality of wiring topologies, and determining an optimum wiring topology from results of the noise check carried out in said carrying out a circuit simulation using the simulation model to use in said, outputting input circuit information so that the optimum wiring topology is determined as the noise countermeasures in said comparing the input circuit information and the recommended circuit information.

7. The noise countermeasure determination method as claimed in claim 1, further comprising:
   creating a simulation model of input circuit information made up of circuit information of a target net which is to be subjected to the noise analysis and circuit information of an adjacent net which is adjacent to the target net, after determining the noise countermeasures
   carrying out a circuit simulation using the simulation model, to obtain a noise combined waveform by combining a crosstalk noise waveform and a signal waveform propagating through the target net which are calculated, and to check whether or not a noise exceeding a tolerable range exists based on the noise combined waveform; and categorizing the noise existing as result of the noise check, and optimizing the determined noise countermeasures to only portions related to the noise.

8. The noise countermeasure determination method as claimed in claim 7, wherein said creating a simulation model creates the simulation model by assuming that the circuit information of the adjacent net is related to a net which has the same structure as the target net and is adjacent to the target net with a constant pattern gap formed therebetween.

9. The noise countermeasure determination method as claimed in claim 8, wherein said creating a simulation model and said carrying out a circuit simulation using the simulation model are repeated while changing the pattern gap, so as to obtain a minimum pattern gap with which the noise obtained as a result of the noise check carried out in said carrying out a circuit simulation using the simulation model does not exceed the tolerable range, and said comparing the input circuit information and the recommended circuit information determines the minimum pattern gap as the noise countermeasures.

10. A noise countermeasure determination apparatus comprising:

a recommended circuit information calculating section calculating recommended circuit information considered to minimize a noise by use of at least one formula, based on input circuit information amounting to at least one net of a target circuit which is to be subjected to a noise analysis; and a noise countermeasure determination section comparing the input circuit information and the recommended circuit information, and determining a differing portion of the recommended circuit information differing from the input circuit information, as noise countermeasures.

11. The noise countermeasure determination apparatus as claimed in claim 10, further comprising:

a circuit model creating section creating a simulation model of the input circuit information after determining the noise countermeasures in said noise countermeasure determination section;

a simulation and check section carrying out a circuit simulation using the simulation model, to calculate a signal waveform propagating through a wiring of the target circuit and to check whether or not a noise exceeding a tolerable range exists in the signal waveform; and a noise countermeasure optimizing section categorizing the noise existing as a result of the noise check carried out in said simulation and check section, and optimizing the determined noise countermeasures to only portions related to the noise.

12. The noise countermeasure determination apparatus as claimed in claim 10, wherein said recommended circuit information calculating section outputs a range of a damping resistance as the recommended circuit information, based on a minimum voltage VIH-1 and a maximum voltage VIH-2 which guarantee a normal operation of the target circuit, by taking a damping resistance which makes a first rising voltage of an input waveform at a receiving end of the target circuit equal to the minimum voltage VIH-1 as a maximum value of the range, and taking a damping resistance which makes the first rising voltage of the input waveform at the receiving end of the target circuit equal to the maximum voltage VIH-2 as a minimum value of the range.

13. The noise countermeasure determination apparatus as claimed in claim 12, wherein said recommended circuit information calculating section compares a damping resistance which makes a voltage at a time of a ringback equal to the minimum voltage VIH-1 and the minimum value of the damping resistance, and outputs a larger one of the compared values as the minimum value of the damping resistance.

14. The noise countermeasure determination apparatus as claimed in claim 10, further comprising:

a circuit information output section outputting input circuit information that includes a wiring length that is substantially a Manhattan distance that is determined based on positions of part pins forming the target circuit and a wiring topology.

15. The noise countermeasure determination apparatus as claimed in claim 13, further comprising:

a circuit model creating section creating a simulation model of the input circuit information after determining the noise countermeasures in said noise countermeasure determination section; and a simulation and check section carrying out a circuit simulation using the simulation model, to calculate a signal waveform propagating through a wiring of the target circuit and to check whether or not a noise exceeding a tolerable range exists in the signal waveform wherein processes of said circuit model creating section and said simulation and check section being repeated using a plurality of wiring topologies, and an optimum wiring topology being determined from results of the noise check carried out by said simulation and check section for use by said circuit model creating section, so that the optimum wiring topology is determined as the noise countermeasures by said noise countermeasure determination section.

16. The noise countermeasure determination apparatus as claimed in claim 10, further comprising:

a circuit model creating section creating a simulation model of input circuit information made up of circuit information of a target net which is to be subjected to the noise analysis and circuit information of an adjacent net which is adjacent to the target net, after determining the noise countermeasures by said noise countermeasure determination section;

a simulation and check section carrying out a circuit simulation using the simulation model, to obtain a noise combined waveform by combining a crosstalk noise waveform and a signal waveform propagating through the target net which are calculated, and to check whether or not a noise exceeding a tolerable range exists based on the noise combined waveform; and a noise countermeasure optimizing section categorizing the noise existing as a result of the noise check carried out by, said simulation and check section, and optimizing the determined noise countermeasures to only portions related to the noise.

17. The noise countermeasure determination apparatus as claimed in claim 16, wherein said circuit model creating section creates the simulation model by assuming that the circuit information of the adjacent net is related to a net which has the same structure as the target net and is adjacent to the target net with a constant pattern gap formed therebetween.

18. The noise countermeasure determination apparatus as claimed in claim 17, wherein processes of said circuit model creating section and said simulation and check section are repeated while changing the pattern gap, so as to obtain a minimum pattern gap with which the noise obtained as a result of the noise check carried out by said simulation and check section does not exceed the tolerable range, and said noise countermeasure determination section determines the minimum pattern gap as the noise countermeasures.

19. A computer-readable storage storing a program for controlling a computer to determine noise countermeasures, by:

calculating recommended circuit information considered to minimize a noise by use of at least one formula, based on input circuit information amounting to at least one net of a target circuit which is to be subjected to a noise analysis; and comparing the input circuit information and the recommended circuit information and determining a differing portion of the recommended circuit information differing from the input circuit information, as noise countermeasures.

20. The noise countermeasure determination method as claimed in claim 1, further comprising carrying out at least one of a circuit rule check and a wiring topology check with respect to the input circuit information.

21. The noise countermeasure determination method as claimed in claim 20, further comprising outputting an advice based on a check result obtained.

22. The noise countermeasure determination method as claimed in claim 21, further comprising correcting the input circuit information based on the advice output.

* * * * *

UNITED STATES PATENT AND TRADEMARK OFFICE
CERTIFICATE OF CORRECTION

PATENT NO. : 7,065,480 B2
APPLICATION NO. : 09/750051
DATED : June 20, 2006
INVENTOR(S) : Shogo Fujimori et al.

Page 1 of 1

It is certified that error appears in the above-identified patent and that said Letters Patent is hereby corrected as shown below:

Column 21, Line 3, after "as" insert --a--.

Column 21, Line 4, after "check" delete ",".

Column 22, Line 53, after "out by" delete ",".

Signed and Sealed this

Fourteenth Day of November, 2006

JON W. DUDAS
*Director of the United States Patent and Trademark Office*